(12) United States Patent
Holmberg

(10) Patent No.: US 6,345,351 B1
(45) Date of Patent: Feb. 5, 2002

(54) MAINTENANCE OF SPECULATIVE STATE OF PARALLEL EXECUTED JOBS IN AN INFORMATION PROCESSING SYSTEM

(75) Inventor: Per Anders Holmberg, Stockholm (SE)

(73) Assignee: Telefonaktiebolaget LM Ericsson(publ), Stockholm (SE)

( * ) Notice: Subject to any disclaimer, the term of this patent is extended or adjusted under 35 U.S.C. 154(b) by 0 days.

(21) Appl. No.: 09/438,325

(22) Filed: Nov. 12, 1999

(51) Int. Cl.$^7$ .............................................. G06F 12/00
(52) U.S. Cl. ..................... 711/203; 711/147; 711/206
(58) Field of Search ......................... 711/202–210, 147, 711/173

(56) References Cited

U.S. PATENT DOCUMENTS

| | | | |
|---|---|---|---|
| 5,339,415 A | 8/1994 | Strout, II et al. | 709/102 |
| 5,748,934 A | 5/1998 | Lesartre et al. | 712/216 |
| 5,751,983 A | 5/1998 | Abramson et al. | 712/216 |
| 5,751,995 A | 5/1998 | Sarangdhar | 711/145 |
| 5,754,812 A | 5/1998 | Favor et al. | 712/216 |
| 5,778,210 A | 7/1998 | Henstrom et al. | 712/218 |
| 5,781,752 A | 7/1998 | Moshovos et al. | 712/216 |
| 5,797,025 A | 8/1998 | Popescu et al. | 712/23 |
| 5,812,811 A | 9/1998 | Dubey et al. | 712/216 |
| 5,838,940 A | 11/1998 | Savkar et al. | 712/216 |
| 5,838,941 A | 11/1998 | Valentine et al. | 712/217 |
| 5,887,161 A | 3/1999 | Cheong et al. | 712/244 |
| 6,023,749 A * | 2/2000 | Richardson | 711/203 |

FOREIGN PATENT DOCUMENTS

EP 0693728 A1 1/1996

OTHER PUBLICATIONS

Per Holmberg, et al., "APZ 212 30—Ericsson's New High-Capacity AXE Central Processor," Ericsson Review No. 3, 1999, pp.148–155.

Richard Rashid et al., "Machine–Independent Virtual Memory Mangement for Pages Uniprocessor and Multiprocessor Architectures", IEEE Transactions on Computers, US, IEEE Inc., New York, vol. 37, No. 8, Aug. 1, 1988, pp.896–907.

Michael K. Johnson , "Linux Memory Management Overview", Oct. 17, 1999, retrieved from the Internet, http:/www.linuxhq.com/guides/KHG/HyperNews/get/memory/linuxmm.html, retrieved on May 16, 2000, 6 pages.

David A. Rusling, "The Linux Kernel (Chapter3: Memory Management)", Oct. 17, 1999, retrieved from the Internet, http://www/linuxhq.com/guides/TLK/mm/memory.html, retieved on May 16, 2000, 14 pages.

Xavier Leroy, "LinuxThreads Frequently Asked Questions (with answers) 'for LinuxThreads Version 0.8!", Oct. 26, 1999, retrieved from the Internet: http://pauillac.inria.fr/{xleroy/linuxthreads/faq.html, retrieved on May 17, 2000.

* cited by examiner

*Primary Examiner*—Do Hyun Yoo
*Assistant Examiner*—Nasser Moazzami
(74) *Attorney, Agent, or Firm*—Burns, Doane, Swecker & Mathis, L.L.P.

(57) ABSTRACT

A computer system uses paged memory mapping techniques to maintain speculative data generated by concurrent execution of speculative jobs. In some embodiments, a set of shared virtual pages is defined that stores data that are shared by a first job and a second job. A set of shared physical pages in the paged physical memory is also defined, wherein there is a one-to-one correspondence between the set of shared virtual pages and the set of shared physical pages. When a job is to generate speculative data, a private physical page in which the data is to reside is created. The contents of the corresponding shared physical page are copied to the private physical page, and the speculative job's accesses are then mapped to the private physical page instead of to the shared physical page. If speculation fails, the private page may be discarded, and the job restarted. If speculation succeeds, memory mapping is adjusted so that the private page replaces the formerly shared physical page.

42 Claims, 14 Drawing Sheets

MAINTENANCE OF SPECULATIVE STATE OF PARALLEL EXECUTED JOBS IN AN INFORMATION PROCESSING SYSTEM

BACKGROUND

The present invention relates to information processing system organizations, more particularly to the parallel execution of computer programs or jobs, and even more particularly to techniques for enabling the speculative execution of concurrent jobs in an information processing system.

The traditional electronic computer has a single processing unit, and operates in accordance with a model whereby program instructions are retrieved ("fetched") one-by-one from an addressable memory, and then executed. Instructions that are to be executed in sequence are typically stored at sequential address locations within the memory. Exceptions to this sequential storage of instructions often occur, as for example when execution of a program segment is made conditional on some condition to be tested (e.g., whether two values are equal to one another), or when execution of the present program segment is to be interrupted by execution of another program segment (e.g., in response to a subroutine call or an interrupt). In such cases, program execution may take what is called a "branch" or "jump" to another location, whereby the fetching of instructions continues not with the next sequentially stored instruction, but with one stored at some other location within the memory.

Regardless of how the instructions are stored, it is the expectation of the programmer that the instructions that constitute a particular job will be executed in a particular order. A consequence of this expectation is that variables will be operated upon (e.g., modified or tested) in a particular sequence. Failure to comply with this expectation can result in a job that generates error-laden results.

It continues to be a goal of computer architects to design systems that can complete more work in less time. One approach for doing this has concentrated on making processing elements that are capable of operating faster. This approach has no impact on the programmer's expectation of sequential program execution.

Another approach to improving processing speed has been to devise processors that are capable of operating concurrently. For example, in a so-called "super-scalar" processor, the elements within a single processor are organized in such a way so as to permit several instructions to be performed concurrently. Another way to provide concurrent execution of instructions (so called "instruction level parallel" (ILP) processing) is to provide multiple processing units, each attached to a shared memory, and to allocate individual instructions of a single program to be run on different ones of the processing units.

In order to ensure that the programmer's expectation of sequential program execution is carried out, these architectures need to deal with two types of dependencies: "control dependency" and "data dependency". Control dependency refers to the dependency of instructions to be executed only as a function of whether a conditional branch or jump has been taken in a preceding instruction. Data dependency is a dependency of instructions that use data that is created or changed by earlier instructions. The later-specified instructions may correctly execute only if the earlier instructions using the same data do not change the common data or have completed the change of the common data.

Rather than holding up the execution of an instruction whose execution is in some way dependent on the results generated by another instruction, these architectures often turn to the speculative execution of an instruction. That is, an instruction is executed as if there were no control or data dependency. The results of such a speculatively executed instructions must be undone in the event that it is later discovered that the originally planned sequential execution of the instructions would have achieved different results. U.S. Pat. No. 5,781,752 describes an ILP architecture that employs a table based data speculation circuit.

In yet another approach to increasing overall processing speed, some computer systems achieve high processing performance through a computer architecture known as Symmetric Multi Processing (SMP). In contrast to the fine-grained parallelism achieved by the above-described ILP architectures, the SMP architecture exploits coarse-grained parallelism that is either explicitly specified in programs designed in accordance with concurrent programming principles, or extracted from programs designed for sequential execution on a single-processor system during compilation.

Coarse-grained parallelism means task-level parallelism as opposed to instruction-level parallelism (although the two types of parallelism are not mutually exclusive—different tasks could be assigned to separate processors which each then employ instruction-level parallelism to carry out their respective task). In an SMP architecture, each one of several rather self-contained and complex computing tasks is carried out on a respective one of several processors. These tasks are mutually concurrent processes, threads or other similar constructs well-known in the information processing arts.

In another computer architecture having multiple processors, further parallelism is extracted during program execution by creating different threads from a single program, and assigning several tasks to different processors for concurrent execution. Because they derive from the same program, these threads may have dependencies similar to those described above with respect to instruction level parallelism. In particular, it is important that the two or more threads maintain data consistency—that is, that a thread intended for later execution not use a data variable that has yet to be updated by a thread intended for earlier execution, and that the thread intended for later execution not modify a data variable that will subsequently be accessed by a thread intended for earlier execution. The occurrence of either of these events is called a "collision".

Because of the possibility of collisions, it is common to insert locks (semaphores) into the code in order to maintain data consistency. This prevents any collisions from happening. However, algorithms that extract parallelism and insert locks for this purpose must be pessimistic because they must guarantee that a collision never occurs. This has the drawback of limiting the amount of parallelism that can be extracted.

As another solution to the problem presented when threads that share a data memory space are concurrently executed, one may employ speculative execution. In speculative execution, a collision between threads is detected and the erroneous results of executed threads are undone or purged.

In one architecture, one of a number of parallel threads is designated as a "committed thread". All other concurrently executed threads are referred to as "speculative threads". The committed thread is a thread that would be executed earliest if execution were sequential. The committed thread stores its state directly in a main memory. (As used herein, the term "state" refers to the execution results of a thread or job, such as memory updates, heap, stack, signaling and so forth.) Speculative threads however temporarily store their states not in the shared memory, but in a memory (or memory area) distinct from the shared memory.

Since the committed thread is the thread intended for the earliest execution if execution were sequential, and since the results of the execution of the speculative threads do not affect the shared memory, there is no question concerning accuracy of the result of the committed thread. When execution of the committed thread is complete, it is simply retired. No particular action is taken with regard to the memory because an accurate state of the committed thread is already part of the shared memory.

After retirement of the committed thread, another thread is designated as a new committed thread. Designating a thread as a new committed thread is called "committing a thread". The order in which threads are committed is always maintained the same as the order in which threads would be executed if they were executed sequentially. Committing a thread is done provided no collision is detected for the thread. When committing a thread that is speculatively executing (or has been speculatively executed), the temporarily stored memory states are copied to the shared memory.

If a speculative thread encounters a collision, the collision is resolved by purging the temporarily stored states of at least all later speculatively executed threads, and executing them anew. Purging the temporarily stored states is also referred to as a "roll-back" or "flush".

Speculative execution in conjunction with detecting collisions, and rolling back state changes when necessary offers a high potential for extracting parallelism from a program. Good performance is achieved so long as collisions do not occur too often (i.e., so long as the overhead associated with performing roll-backs is not excessive).

The "Program Language for EXchanges" (PLEX) programming-model by Telefonaktiebolaget LM Ericsson employs essentially non-preemptive scheduling. Each PLEX program is divided into multiple jobs. A job is the execution of a sequential program that is initiated by a scheduler in response to an event, and that uninterruptedly continues until it finishes without external intervention. An event may result from an externally generated request (such as by a telephony subscriber) or it may result from a request generated by another job. Several jobs are generally queued in the scheduler, and carried out in a first-come-first-served manner.

PLEX lends itself well to parallel processing. Jobs are simply scheduled on multiple processors by a scheduler. However, when PLEX programs that are designed for execution on a single processor are executed on multiple processors in parallel, dependencies may emerge because jobs operate on a shared memory.

According to another concept developed at Telefonaktiebolaget LM Ericsson, called "Job Parallel Computer" (JPC), dependencies between jobs executed in parallel are resolved through speculative execution. In JPC, one and only one job at a time is committed. States of the committed job are effectuated immediately in the shared memory during execution. If there is no dependency when execution of the committed job finishes, a speculatively executed job becomes committed as determined by the scheduler. States generated by the speculatively executed job being committed take effect in the shared memory only after the previously committed job finishes execution and the speculatively executed job becomes the new committed job.

In the event of a dependency, speculatively executed jobs are flushed and execution of the speculatively executed jobs is repeated. A strict scheduling order is always maintained.

Dedicated hardware is used for managing coarse-grained parallelism with speculative execution. The dedicated hardware includes a memory area for temporarily storing information from speculative execution of threads or jobs. When it is time to commit a speculatively executed job, the information is copied from the temporary storage area into the shared memory.

The existing approaches to enabling coarse-level concurrent execution of jobs have a number of problems. First, they generally require dedicated hardware support for managing coarse grained parallelism with speculative execution. However, it would be desirable to be able to benefit from the full potential of computer architectures implemented with standard processors. In particular, programs designed under the sequential programming paradigm have not benefitted from the coarse-grained parallel capabilities of a multi-processor based computer that uses standard processors.

Furthermore, the need to copy the speculatively executed job's data from the temporary storage area into the shared memory at the time of commitment adds an additional overhead that slows down the overall information processing rate.

SUMMARY

It is therefore an object of the present invention to provide a technique for enabling coarse-grained execution of concurrent jobs that does not require special support hardware to handle speculative execution of jobs.

In accordance with one aspect of the present invention, the foregoing and other objects are achieved in a computer system that includes a paged physical memory. In some embodiments that employ a "privatization" strategy to maintaining speculative execution states in a reversible manner, a set of shared virtual pages are defined that stores data that are shared by a first job and a second job. A set of shared physical pages is also defined in the paged physical memory, wherein there is a one-to-one correspondence between the set of shared virtual pages and the set of shared physical pages. A first memory map causes the first job to access a first shared physical page in the memory whenever the first job accesses any location in a first virtual page in the set of shared virtual pages, wherein the first shared physical page is in the set of shared physical pages. A second memory map also causes the second job to access the first shared physical page in the shared memory whenever the second job accesses any location in the first virtual page. However, the second memory map also causes the second job to access a private physical page whenever the second job accesses any location in a second virtual page in the set of shared virtual pages, wherein the private physical page is not in the set of shared physical pages. In this manner, speculative data will be maintained in the private physical page, separate and apart from the shared physical page.

In another aspect, the private physical page may be created in response to a sequentially first write operation directed to the second virtual page by the second job. That is, the private physical page may be created on demand.

In still another aspect, creation of the private physical page may be performed in response to a first write protect interrupt associated with the sequentially first write operation directed to the second virtual page by the second job.

In yet another aspect, a translation lookaside buffer associated with the second job is initialized with one or more entries from the first memory map. Write protection is initially enabled in connection with one or more pages identified by the one or more entries from the first memory map.

In still another aspect, write protect associated with the second virtual page is disabled after the first write protect interrupt. This will prevent further write protect interrupts associated with the second job accessing the second virtual page.

In another aspect, a collision between the first job and the second job will cause the private physical page to be released. Thus, it takes very little effort to "restore" the state of the shared memory to its original condition because it has never been changed.

In still another aspect, if both the first job and the second job complete without an occurrence of a collision between the two, the set of shared physical pages is redefined to include the private physical page in place of the second shared physical page. This has the further advantage of avoiding the need to copy the speculatively generated data into a shared memory space.

In yet another aspect, the second memory map comprises a shared page table and a private page table. The shared page table stores mappings between shared virtual pages and shared physical pages, whereas the private page table stores mappings only between shared virtual pages and private physical pages. A two-level table is thereby created.

In still another aspect, using the second memory map to cause the second job to access the first shared physical page in the shared memory whenever the second job accesses any location in the first virtual page comprises first determining whether a mapping associated with the first virtual page is stored in the private page table; and then locating a mapping associated with the first virtual page in the shared page table if the private page table does not have stored therein any mapping associated with the first virtual page.

In alternative embodiments, a "non-privatization" strategy is adopted to maintain speculative data. Again, a set of shared virtual pages is defined that stores data that are shared by a first job and a second job; and a set of shared physical pages is defined in the paged physical memory, wherein there is a one-to-one correspondence between the set of shared virtual pages and the set of shared physical pages. A first memory map causes the first job to access a first shared physical page in the memory whenever the first job accesses any location in a first virtual page in the set of shared virtual pages, wherein the first shared physical page is in the set of shared physical pages. A second memory map causes the second job to access the first shared physical page in the shared memory whenever the second job accesses any location in the first virtual page. In these embodiments, a backup physical page is created in response to a sequentially first write operation directed to the first virtual page by the second job, wherein the backup physical page includes a copy of all data contained in the first shared physical page, and wherein the backup physical page is not in the set of shared physical pages. Both the first and second jobs will continue to access the same shared physical page. However, the backup physical page can serve to maintain the original state of the shared physical page, should restoration become necessary due to a collision between jobs.

In another aspect of these embodiments, in the event of a collision, the set of shared physical pages is redefined to include the backup physical page in place of the first shared physical page. This advantageously eliminates the need to actually copy data from the backup physical page to the original shared physical page.

If both the first job and the second jobs complete without an occurrence of a collision between the two, the backup physical page may be released.

BRIEF DESCRIPTION OF THE DRAWINGS

The objects and advantages of the invention will be understood by reading the following detailed description in conjunction with the drawings in which.

DETAILED DESCRIPTION

Figure 1:
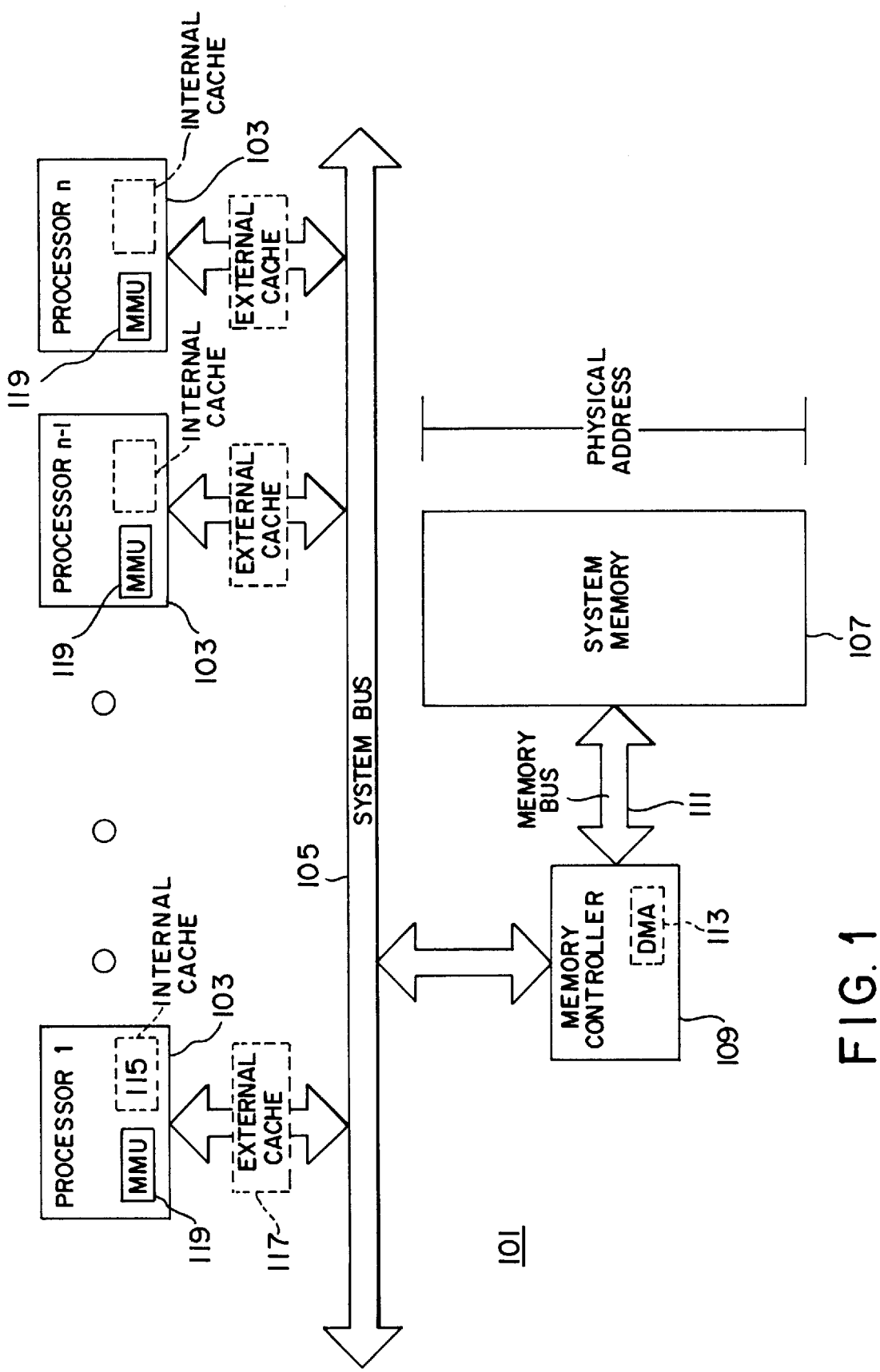
FIG. 1 is a block diagram of an exemplary multi-processing system that is suitable for implementing the various aspects of the invention.

The various features of the invention will now be described with respect to the figures, in which like parts are identified with the same reference characters.

Techniques will now be described that enable standard memory management hardware support to be used for managing coarse-grained parallelism with speculative execution of jobs in a multi-processor based computer. This involves, for each speculatively executed job, the use of memory mapping such that the speculative job's write operations will be directed to a non-shared ("private") storage area. The memory mapping may be accomplished by means of conventional memory management techniques that are supported by many commercially-available processors. The memory management unit's tables may be modified to point to a private set of data pages, rather than to pages associated with a shared memory space. An advantage of this technique is that, should a rollback be necessary (i.e., due to a detected collision), it may easily be accomplished merely by deallocating the private storage area.

If a rollback is not necessary, the speculative job may be committed by copying the data from the private storage area into the shared storage area. However, a further benefit can be achieved by, instead of copying data as described, merely using the standard memory management techniques to revise the mapping in such a way that the private page becomes part of the shared memory area.

The creation and mapping of the private pages can be performed at the time a speculative job is created. Alternatively, these operations can be performed on demand, when the speculative job first attempts to write data to any location within a given page.

These and other aspects of the invention will now be described in greater detail in connection with a number of exemplary embodiments. To facilitate an understanding of the invention, many aspects of the invention are described in terms of sequences of actions to be performed by elements of a computer system. It will be recognized that in each of the embodiments, the various actions could be performed by specialized circuits (e.g., memory management unit hardware), by program instructions being executed by one or more processors, or by a combination of both. Moreover, the invention can additionally be considered to be embodied entirely within any form of computer readable storage medium having stored therein an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiment may be referred to herein as "logic configured to" perform a described action.

Referring first to FIG. 1, this is a block diagram of an exemplary multiprocessing system 101 that is suitable for implementing the various aspects of the invention. The exemplary system 101 has a SMP architecture that includes one or more processors 103 that communicate with each other over a bus 105. Although it is not required for practicing the invention, in exemplary embodiments each of the processors 103 has a super-scalar architecture, such as that of the Pentium-Pro™ processor offered by the Intel™ Corporation.

The system 101 is designed in accordance with any one of a number of well known standard platforms widely used in the computer industry. In the exemplary embodiment, the system 101 further includes, in addition to the processors 103, a system memory 107 and a memory controller 109. The system memory 107 and the memory controller 109 communicate with each other over a memory bus 111.

The memory controller 109 controls memory access to or from the system memory 107 by the microprocessor processors 103 over the memory bus 111. In response to read and write access requests generated by the processors 103, the memory controller 109 generates corresponding memory access cycles directed towards the addressed memory locations within the system memory 107. The memory controller 109 may also include a well known direct memory access (DMA) unit 113 (shown in dotted lines), a facility of some architectures which allows a peripheral to read and write to the system memory without intervention by the processors 103. Preferably, the system 101 also includes one or more internal or external cache memory units 115 and 117 (shown in dotted lines). The cache units 115 and 117 store a certain portion of the system memory 107 that is used more frequently by the processors 103. It should be noted that some multi-processor system architecture provide each processor with a dedicated cache memory, while others provide a shared cache memory unit for all of the processors.

The system memory 107, which is accessible to each processor 103, has a predefined physical memory address range. In order to access (i.e., read or write) any location within the system memory 107, it is therefore necessary to present a corresponding physical memory address to the system memory 107 by means of the memory bus 111. However, computer programs (e.g., operating system, application programs, emulation programs, etc.) running on any of the processors 103 do not use these physical addresses directly. Instead, each computer program sees a virtual address space that may or may not be the same size as that of the physical address space.

Because of the use of virtual addressing, it is necessary to translate each virtual memory address into a physical memory address whenever the system memory 107 is to be accessed. To facilitate this process, the virtual and physical address ranges are each divided into blocks of contiguous addresses. Each one of these blocks, which is also known as a "page", has a fixed number of consecutive memory addresses associated with it. Typically, each page has a size of $2^N$, where N is an integer. Thus, given a pointer to the start of a page (in either the virtual or physical memory space), an N-bit offset address may be used to access any location within the page.

Each page is, itself, associated with a unique page number that distinguishes it from all other pages. Assuming, then, that the number of pages in the memory (whether virtual or physical) is $2^M$, an address that uniquely identifies one memory location can be formed by concatenating the page number with the N-bit offset address described above to form an M+N bit address. As mentioned earlier, the size of the virtual memory space need not be equal to the size of the physical memory space. Consequently, the value of "M" need not be the same for a virtual address as it is for a physical address.

As mentioned earlier, the M+N bit virtual addresses used by the running programs need to be translated into physical addresses before they can be supplied to the system memory 107. To perform this function in the exemplary embodiment, each processor 103 is equipped with a memory management unit (MMU) 119 that treats the most significant M bits of each address as a page number, and the remaining N bits as an offset within the page. A page table (not shown in FIG. 1) located within the system memory 107 uniquely maps each of the $2^M$ virtual pages to a corresponding physical page in the system memory 107. When the MMU 119 performs logical to physical address translation for each memory read or write, it does so by performing a table look-up (also referred to as a "table walk"), locating the relevant page table entry, and then calculating the physical address. The traditional way to organize a page table is as a two- or three-level indexed look-up table, or as a hash table. To speed up page table look-up, special caches, called Translation Look-aside Buffers (TLBs) are introduced for holding the most-used translations. When a system includes TLBs, table look-up is needed only when the TLB fails to include a translation for a requested virtual page. This occurrence, which is referred to as a "TLB miss", typically causes an interrupt that not only performs the necessary table lookup, but also loads an appropriate entry in the TLB so that this translation can be more efficiently performed in the future.

Systems can be designed to perform table walk operations either in hardware or in software. The use of hardware-implemented table walks has the advantage of being slightly faster than software implementations. One disadvantage of hardware-implemented table walks is the added hardware complexity. Another disadvantage is reduced flexibility: when implemented in hardware, the table structure and the TLB miss handling in general is also determined by the hardware, and cannot be defined by the operating system being run on the hardware.

To implement table walks in software, program execution takes a trap in the processor, and performs a table walk in the trap handler. An advantage of this approach is reduced chip complexity (compared to hardware-implemented table walks). Furthermore, the table structure, as well as the handling in general, can be specified by the running operating system.

In addition to the above-described mapping information, each page table entry (PTE) also includes information that indicates whether (and possibly when) a virtual/physical page was accessed, as well as whether the virtual page should be cached or not.

The PTE may also contain memory protection flags. Memory protection is a mechanism that prevents one portion of a program from accidentally accessing the memory allocated to another portion of the program. One example is the allocation of an "own" protected memory space to each of a number of user processes. (A process is a sequentially executed program.) Read and write operations by one process to the memory allocated to another process are not permitted to occur. Any attempt to do so results in a so-called "trap exception." A trap is a software interrupt that transfers execution control from the program that performed the trap-causing instruction to another portion of the program ("trap handler"), which is typically part of the operating system. (An operating system is a special program that controls the execution of other programs on the underlying hardware.) The operating system then resolves the trap-related problem as fit. The use of the trap handler routine in connection with the invention will be described in greater detail later in this description.

Memory management is typically transparent to ordinary application programs. Consequently, a program's view of how its storage is laid out in virtual address space (virtual storage) need not match how that storage is arranged in the physical address space (physical storage). In particular, the system memory 107 may appear to the program as a sequence of consecutive memory addresses (in virtual storage), even though it may actually be mapped to a number of scattered (e.g., non-contiguous and/or out of sequence) physical memory pages within the system memory 107. This permits the underlying operating system to utilize memory allocation strategies that make most efficient use of the available physical memory.

It should be noted that the exemplary embodiment depicted in FIG. 1 is but one of many possible SMP architectures that may effectively be used for the invention. For example, various physical memory and cache structures may be used, both shared or distributed. These may be bus or switch interconnected. Furthermore, physical memory may be centralized, or distributed among the processors 103.

Figure 2:
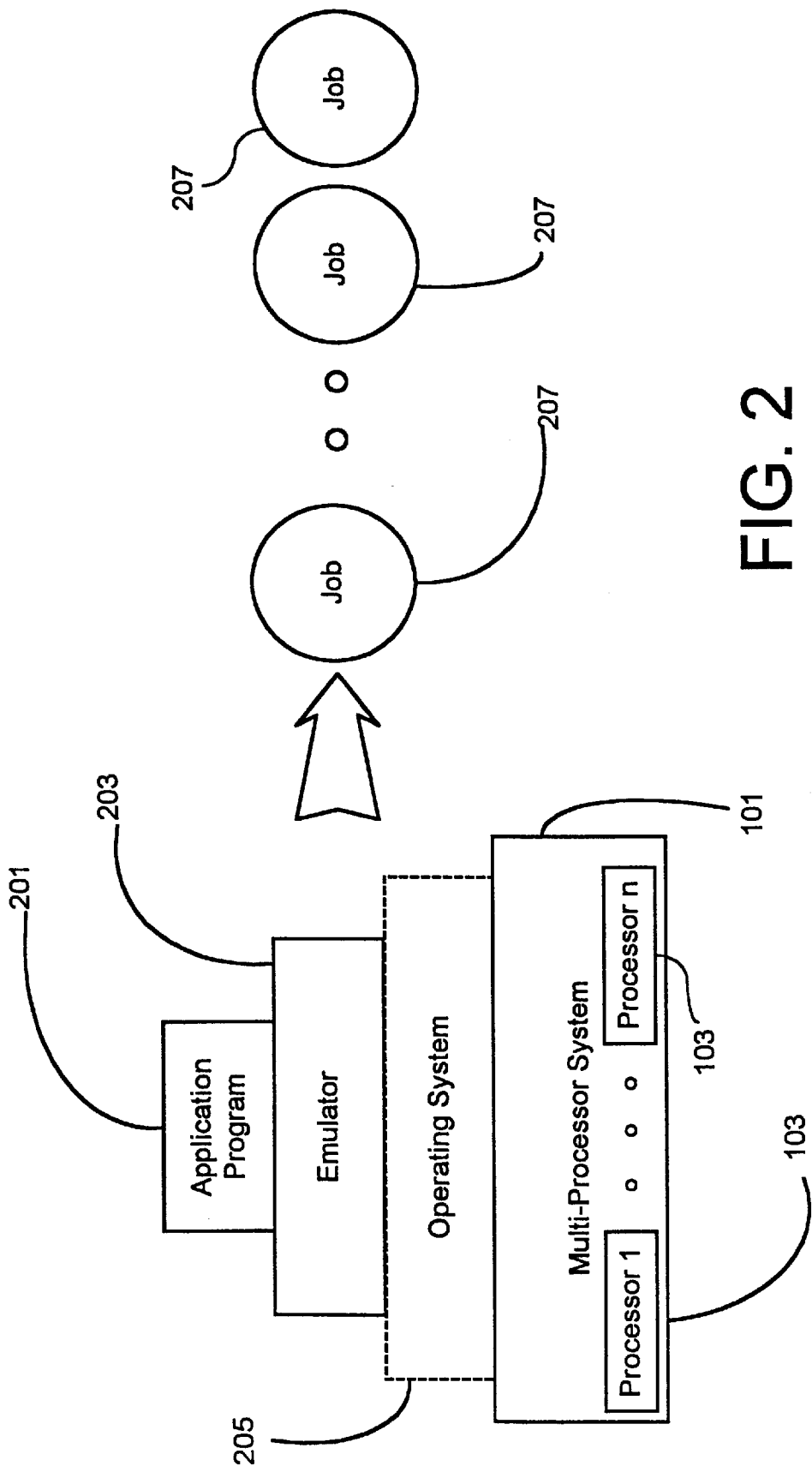
FIG. 2 is a block diagram of an exemplary arrangement of software for supporting concurrent execution of jobs that share a memory space.

The discussion has focused on the physical organization of the system 101. However, the software in the system should also be suitably arranged to support concurrent execution of jobs that share a memory space. One such arrangement is depicted in FIG. 2. The system 101 is controlled by a hierarchy of programs. At the top level is an application program 201. The application program 201 may, for example, be a so-called "legacy" program that was originally intended for execution in a single processor environment. Consequently, the application program 201 is not particularly adapted to handle the problems associated with concurrent execution of its constituent parts.

To provide this adaptation, the application program 201 interfaces with an emulator program 203. Emulator programs are well-known in the art as programs that create a virtual machine that allows applications, originally written for another processor, to execute on an available, different processor either by interpreting the application code or by recompiling the application code. For example, a Java Virtual Machine (JVM) is an emulator that allows Java byte code to execute on almost any processor. Emulator programs may either directly interface with the underlying processing equipment, or may alternatively operate by means of interaction with an operating system 205 (shown in dotted lines in FIG. 2) that directly interacts with the underlying processing equipment.

In the present environment, the emulator program 203 (either alone, or acting in conjunction with the operating system 205) creates a virtual machine that allows the application program 201 to execute on the available multi-processor system 101. Here, one of the tasks of the emulator 203 is to transform the application program 201 into one or more jobs 207, each of which will be run on one of the processors 103 in the system 101. Separate jobs can be created for basic blocks in the application program 201, for individual iterations in a loop, for method calls in an object oriented program or between tasks. The particular approach taken in this regard is up to the designer, and is beyond the scope of this description.

The use of an emulator program 203 as depicted in FIG. 2 is but one way of generating and running parallel jobs 207 from an application program 201. In an alternative embodiment, one would forgo the use of the emulator 203 in favor of recompiling the source code for the application program 201. The compiler used in this instance would be one that generates object code for a plurality of jobs 207, each intended for concurrent execution with other jobs 207.

In another alternative, one might forgo the use of the emulator 203 in favor of an "instrumentation" process in which the object code for the application program 201 is modified by breaking it up into separate jobs 207, and adding suitable instructions that will support concurrent execution of the plurality of jobs 207.

In yet another alternative, the application program 201 might be written in the PLEX programming language. In this case, the code is already divided into threads or jobs 207, so the emulator 203 is unnecessary.

Regardless of the technique used for creating them, because the jobs 207 are generated from what was a single application program 201, it is likely that at least some of the jobs 207 will share a memory space. However, in order to run a number of concurrent jobs that share a memory space, support must be provided to maintain the integrity of the data. As explained in the BACKGROUND section, so-called "collisions" can occur whenever two or more jobs, originally intended for sequential execution on a shared memory space, are run concurrently. Such collisions can result in erroneous execution results if no steps are taken to resolve them.

Figure 3:
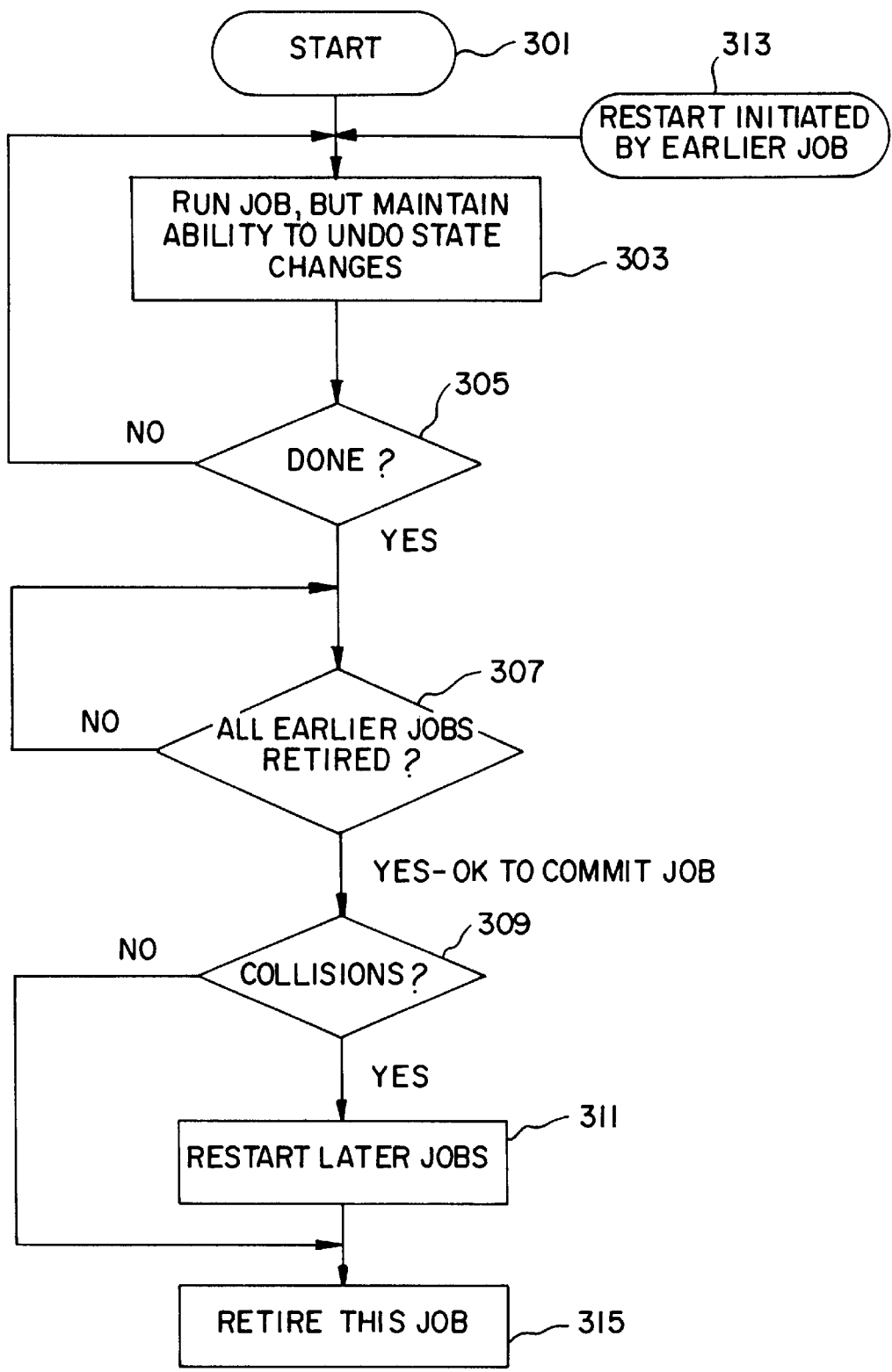
FIG. 3 is a flowchart depicting an overall strategy that may be adopted to concurrently run the jobs that share a memory space, in accordance with an aspect of the invention.

FIG. 3 is a flowchart depicting the overall strategy that is adopted to concurrently run the jobs 207 that share a memory space. Fundamental to the strategy is the notion that the jobs 207 can be arranged in an execution order that would guarantee valid results if the jobs 207 were to be executed one at a time. For example, when the jobs 207 are derived from a single application program originally intended for execution on a single processor, the "correct" execution order for the jobs is the one defined by the application program. In another example, the jobs 207 may not all derive from the same application program, but may instead be generated by independently executing programs external to the system 101. In such a case, it may not matter whether one job 207 executes before or after another. Nonetheless, if the jobs share a memory space and are run concurrently, intermediate states of one job 207 could be modified by the other, thereby leading to invalid results. Thus, a "correct" execution order can be defined for these jobs as well. For example, the "correct" execution order could be defined as the order in which the jobs are presented to the system 101 for execution (i.e., first-in-first-out, or FIFO).

Turning now to the flow chart of FIG. 3, the jobs may be considered to be queued up in their "correct" execution order. In the exemplary embodiment, the queue may not only hold jobs 207 awaiting assignment to a processor 103, but may also hold jobs 207 that have already been launched for execution on one of the processors 103, but which have not yet been retired. (Retirement of a job 207 occurs after the job 207 has completed its execution without "colliding" with any earlier job 207.) Thus, when one of the processors 103 becomes available (due to completion and retirement of an earlier job 207), the unlaunched job 207 closest to the head of the queue is started (step 301). The newly launched job 207 may remain in the queue until it has been retired.

So long as other earlier jobs 207 are running in other processors 103, each newly launched job 207 is run speculatively. That is, it is executed in the processor 103 in a way that, in addition to generating a changed memory state, also preserves the original state of the shared memory space (step 303). As used here, the term "original" means that memory state in existence at the time when the job 207 was first launched. As will be seen, it is necessary to maintain the ability to undo any memory state changes in the event that a collision is detected between the present job 207 and one having an earlier place in the queue.

At some point, the job 207 will finish to completion ("YES" path out of decision block 305). It must now be determined whether the job 207 may be retired. This involves determining whether all earlier jobs have been retired (decision block 307), such as by detecting that the now-completed job 207 is at the head of the queue. If at least one earlier job 207 has not yet completed, then the present job 207 must still be considered speculative, since its own generated state may not be correct due to one or more collisions with the state(s) of the earlier job(s) 207. As a speculative job 207, the present job 207 cannot be retired. Thus, it must continue to wait ("NO" path out of decision block 307).

At some point, it is determined that all earlier jobs have been retired ("YES" path out of decision block 307). At this point, the present job 207 can be considered a "committed" job—its generated memory state is considered correct, and will be used as an "original" memory state for later jobs. Prior to retiring the present job 207, which includes removing it from the queue, a determination is made regarding whether any collisions occurred with later jobs, or whether there is the possibility of collisions with later jobs (decision block 309). A collision has occurred when a still speculative job has read a memory location that was subsequently modified by the now "committed" job. According to the "correct" job ordering, the speculative job should have obtained the modified value. However, due to speculative execution, the speculative job's memory access occurred at an earlier time, and hence picked up the wrong value.

Checking for the occurrence of collisions involves a certain level of overhead, and can be performed in any of a number of known ways. Of course, a mechanism can be employed to determine, in fact, whether a collision occurred at a particular memory location. One technique involves associating a vector of bits with each memory location for which dependency checking is to be made. The vector has at least as many bits as there can be concurrently executed jobs 207 in the system 101. Each bit in the vector is associated with one of the concurrently executed jobs, and the bits are ordered in correspondence with the level of speculation associated with the corresponding job 207—at one end of the vector, the bit is associated with the earliest running job 207, and at the other end the bit is associated with the latest of the running jobs 207. When a job performs a read to a location, its corresponding bit in the corresponding vector is set. Whenever a job 207 performs a write, it checks to see whether any of the "read bits" for later jobs are set. If so, each of those jobs has used the wrong data, and is therefore flushed and restarted.

This collision detection technique comes at the expense of quite a bit of overhead, since not only must the address of every memory access be compared between the two jobs, but also the order of the speculative job's reads relative to the last write of the committed job must be determined. In the case of the above-described collision detection technique, this is done by performing a collision detection with every write operation.

Rather than incurring this level of overhead, many embodiments make tradeoffs between amount of overhead required and the level of certainty that can be obtained regarding whether a collision did, in fact, occur. For example, many known systems perform collision detection by comparing the particular memory addresses used by a committed job with the particular memory addresses used by a speculatively executed job. However, as is described in U.S. patent application Ser. No. 09/438,320, filed on Mar. 12, 1999 in the name of N. Tikekar et al. and entitled "Coarse Grained Determination of Data Dependence Between Parallel Executed Jobs in an Information Processing System", which is hereby incorporated herein by reference in its entirety, dependency checking overhead can be substantially reduced by merely determining whether two jobs accessed the same block of memory, irrespective of whether they actually accessed the same location within that block. Although this increases the probability of needlessly discarding ("flushing") the speculatively generated state and re-running the speculative job, this probability can be kept to a low enough level that the advantages of reduced overhead outweigh the disadvantages.

Continuing with the discussion of FIG. 3, if a collision is detected ("YES" path out of decision block 309), then the speculative job or jobs 207 associated with the collision(s) must have their speculatively generated states flushed, and the jobs restarted (step 311). In connection with this possibility, the entry point 313 in FIG. 3 indicates the occurrence of the present job 207 being restarted due to a collision with an earlier job 207 (i.e., the earlier job 207, itself executing step 311, would have caused the present job 207 to undo any generated state changes and to start over from the beginning).

Restarts may be implemented in any of a number of ways. In many systems, a process state is usually kept in a process control block (PCB). When the process (job) is scheduled for execution, the contents are copied into processor registers. So long as the PCB is not deliberately changed, the original will be there for a restart. In other types of systems, PCBs are not used. Instead, the start condition is fully defined by a job start signal. This is the case, for example, in the AXE system, commercially available from Telefonaktiebolaget LM Ericsson in Stockholm, Sweden. A start signal may be generated within the system, or it may be externally generated and received from a remote processor. In these types of systems, job restart is made possible by leaving the job signal intact until the job becomes non-speculative (i.e., after it has been granted commit priority).

After restarting the later job(s) 207 associated with the collision(s), or if no collisions had occurred ("NO" path out of decision block 309), the present job 207 can be retired. This means taking whatever actions are necessary to cause the speculatively determined state to be included as part of the shared memory space, and to remove the job 207 from the queue of jobs. It should be noted that the strategy of maintaining the resulting state generated by the present job 207, and then retiring the present job 207, can only be performed if that state is correct. This is the case for embodiments that employ a "privatization" strategy (described more fully below). In other cases (e.g., in a "non-privatization" strategy, described more fully below), the state of the present job 207 must also be flushed, and the present job restarted. This latter approach may also be employed along with a "privatization" strategy, although it is not as efficient as that depicted in FIG. 3.

The discussion will now focus on techniques for running a speculative job 207 in such a way that any shared memory state changes that result from execution of the job 207 can be undone, as called for in step 303. This can be accomplished in several ways.

In a first technique, called "non-privatization", all of the speculative job's reads and writes are directed to the right places in the shared memory space. Prior to performing any write, however, the old value stored at the targeted memory address is copied to a history log. This prepares the system 101 for a roll-back of the state (i.e., copying all of the old values from the history log back to their original places in the shared memory space) in case the speculation fails. For those cases in which the speculation succeeds, this history log is simply flushed, thereby preserving the changes in the shared memory space.

In an alternative technique, called "privatization", the speculative job 207 does not write to the shared memory space, but instead directs all of its write operations to its own private memory area—no other job 207 shares this memory space. If the speculative execution succeeds, then the job 207 becomes non-speculative, and the writes to the private memory area may be copied to the correct place in the shared memory space. If, instead, the speculation fails, then the private area is flushed. With this technique, so long as the job 207 is speculative (i.e., so long as there is still an earlier job 207 running concurrently), all reads performed by the speculative job 207 must include a check in the private area to determine whether there is an updated value that should be used. If not, then the read is directed to the original location in the shared memory.

Each of the above techniques can be implemented by using standard paging techniques as supported by the MMUs 119 found in most microprocessors. More particularly, memory mapping techniques are applied to create pages for holding speculative data separate and apart from the pages that comprise the shared memory space. In addition to doing away with a requirement for specialized hardware to support the maintenance of speculative states, these techniques can eliminate much of the overhead associated with copying data, as will be seen below.

Figure 4:
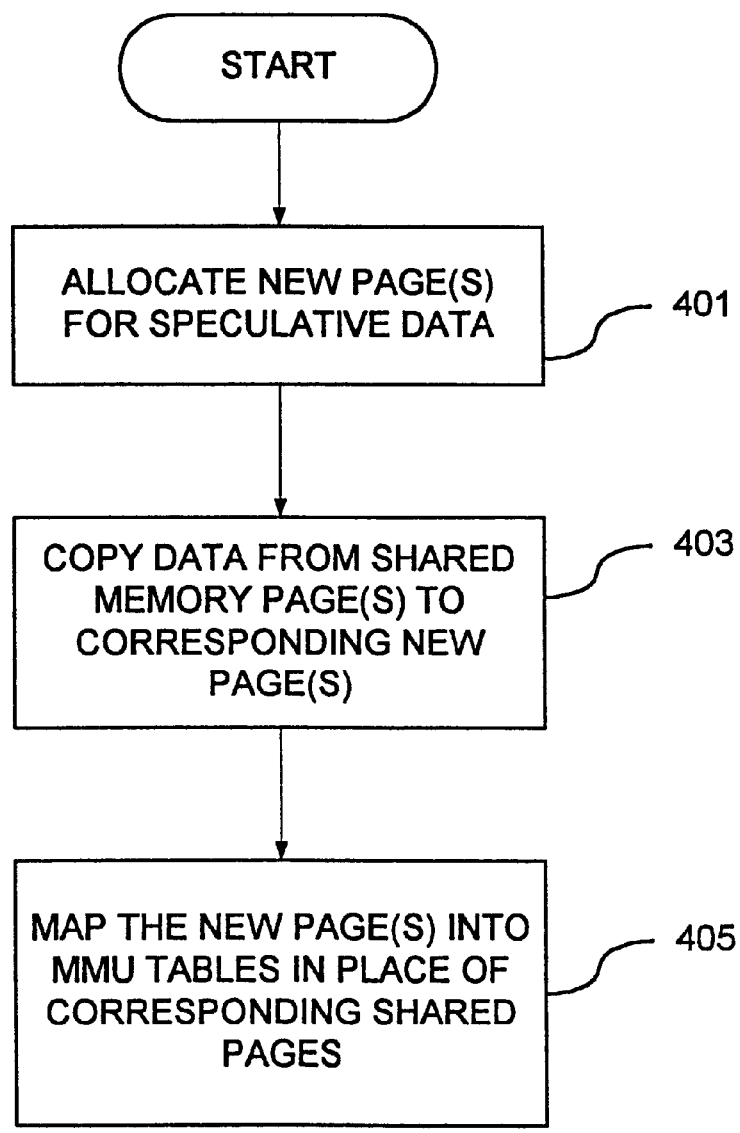
FIG. 4 is a high level flow chart depicting exemplary steps for creating pages for holding speculative data, in accordance with an aspect of the invention.

Viewed at a high level, the creation of pages for holding speculative data requires several steps, as illustrated in the flow chart of FIG. 4. First, one or more pages must be allocated for holding the speculative data (step 401). Next, data from the shared memory page(s) is copied to the corresponding new page(s) (step 403). After the copying operation, the newly allocated page and the original page in the shared memory space are identical. Consequently, it does not matter which is used for keeping the original data and which is updated by the speculative job. If the speculative job is permitted to access the original shared memory page, then the new page is available for use in restoring the original state. Alternatively, if the speculative job is only permitted to access the new page, then the data copying operation ensures that any read operations directed to a shared memory space by the speculative job will pick up a correct value after being mapped to the speculative data page.

Finally, the new page(s) are mapped into the MMU page tables in place of the corresponding original page(s) (step 405). Additional tables are constructed for keeping track of the speculatively allocated pages along with the identities of which original pages they replace. These tables are used when either committing (i.e., retiring) or flushing a speculative job. If the speculation fails, then the new pages are scrapped, and the MMU tables restored to point to the original state. Alternatively, if speculation succeeds, then the speculative pages should replace the original pages and the original pages should be scrapped instead.

Figure 5:
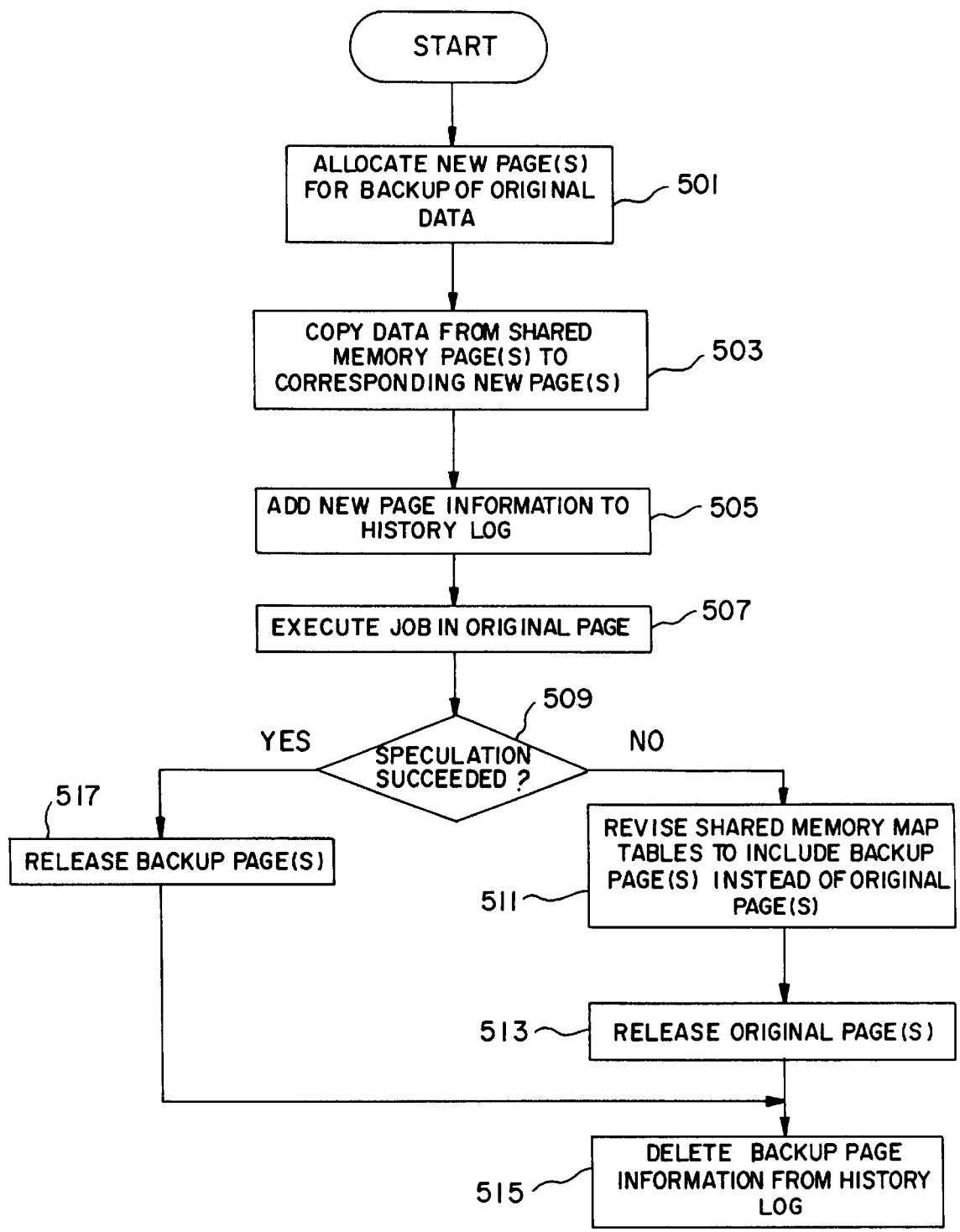
FIG. 5 is a flow chart of an exemplary technique for applying a non-privatization strategy to the use of memory mapping for maintaining speculative data, in accordance with an aspect of the invention.

In one class of embodiments, a non-privatization strategy is applied to the use of memory mapping to maintain speculative data. Referring now to the flow chart of FIG. 5, a non-privatization embodiment involves allocating a new page or pages to be used for backing-up the original data (step 501). Data from the shared memory pages are then copied to the corresponding newly allocated backup pages (step 503). Pointers to the newly created backup copies are then added to a system-maintained history log together with information identifying which pages they point to (step 505).

In some embodiments, the entire shared memory space may be duplicated in the back-up pages. However, as will be seen, it may be preferable to backup only those pages that are actually going to be modified by the speculative job 207. This strategy avoids the overhead associated with needlessly copying data, and with unnecessarily tying up memory resources.

Figure 6A:
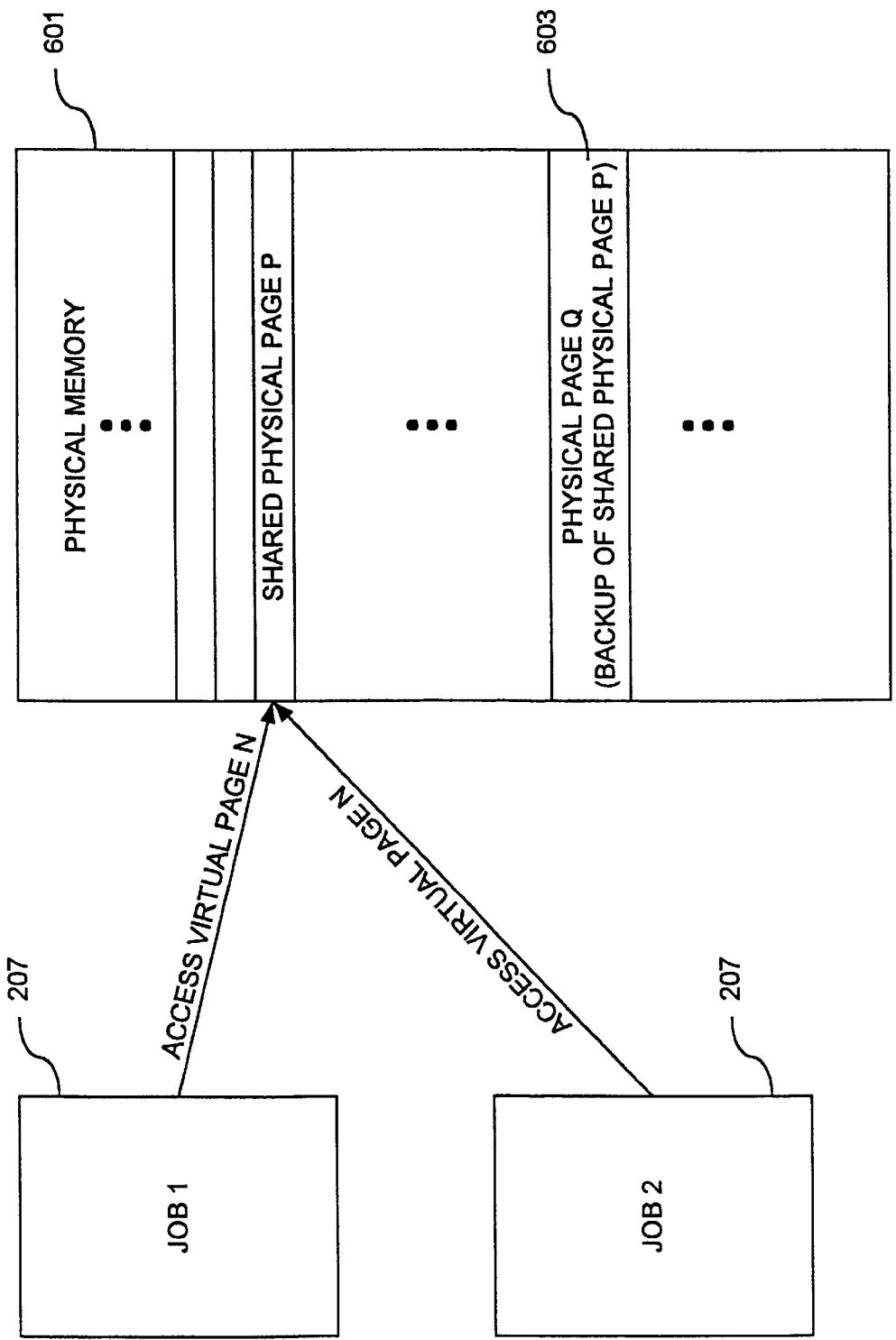
FIGS. 6a and 6b are block diagrams illustrating examples in which concurrently executing jobs apply a non-privatization strategy to the use of memory mapping for maintaining speculative data, in accordance with an aspect of the invention.

The job 207 then executes using the pages associated with the shared memory (step 507). This situation is illustrated in the block diagram of FIG. 6a. In this example, two jobs 207 (numbered "1" and "2") share a virtual memory space, and execute concurrently. When each of the jobs 207 accesses a virtual page N, the access is mapped to an original shared physical page, here illustrated by shared physical page P. However, the second job 207 has made a backup 603 of shared physical page P. The backup 603, which is located in physical page Q, is not mapped to any of the virtual pages within the shared virtual address space. Consequently, the backup 603 is not part of the shared physical address space.

Referring back now to FIG. 5, if the speculative execution of the job 207 does not succeed (due to collision with an earlier job 207) ("NO" path out of decision block 509), it is necessary to undo the shared memory state changes attributable to this job. This is accomplished by substituting the backup pages for the corresponding original pages in the shared memory map tables (step 511) and releasing the original pages (step 513). The information relating to the backup pages is then deleted from the history log (step 515).

Figure 6B:
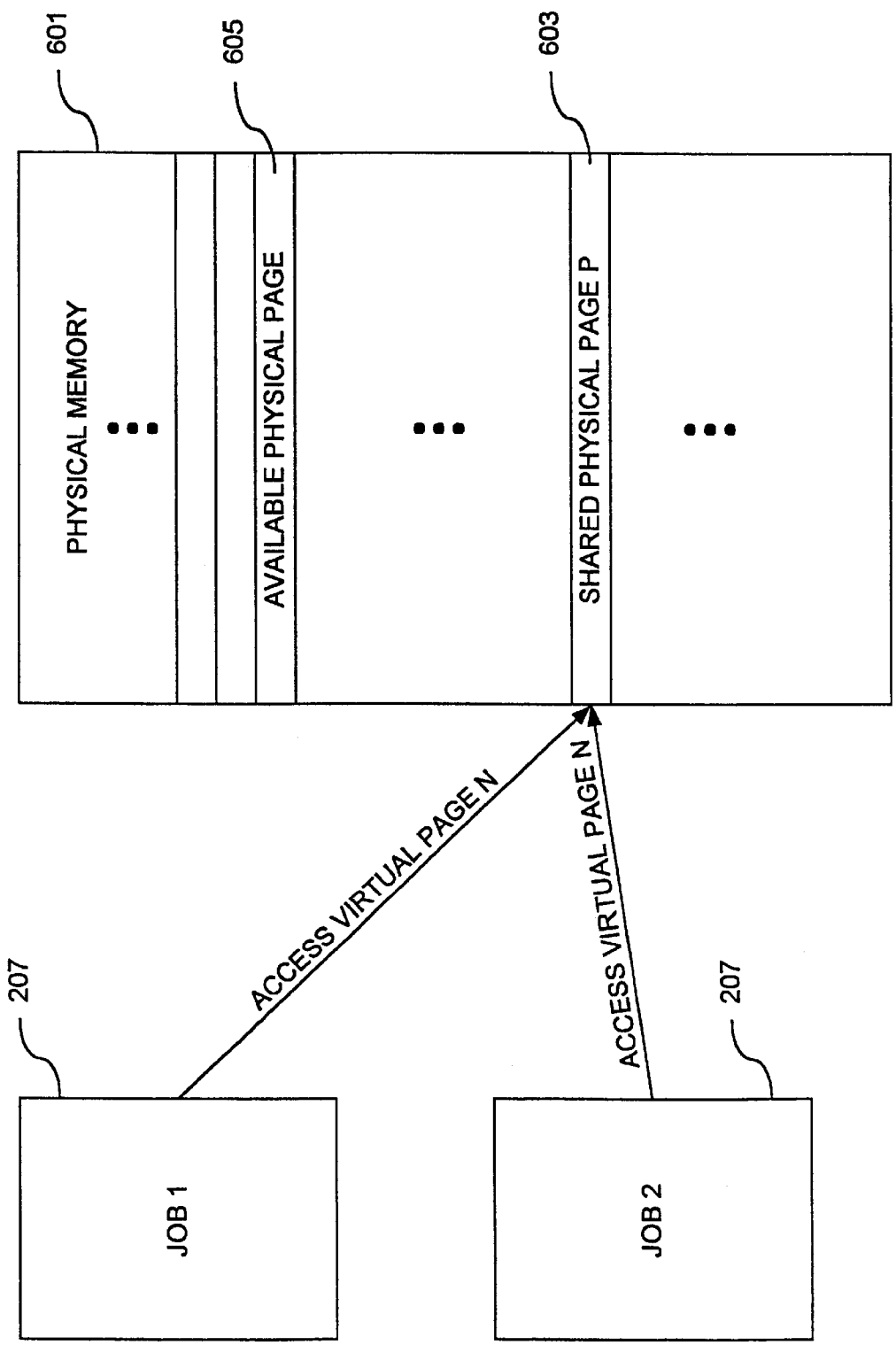

This situation is illustrated by the block diagram of FIG. 6b. Here, the backup 603 of shared physical page P has been mapped to virtual page N, so that when the jobs 207 are re-executed, virtual page N has been restored to its original state. Of course, steps must now be taken to ensure that the first and second jobs 207 do not collide again, thereby repeating the unsuccessful speculative execution that resulted from the first attempt. This is done by re-running the first and second jobs, but this time sequentially.

Referring back now to FIG. 5, if the speculative execution of the job 207 was successful (i.e., there was no collision with an earlier job 207) ("YES" path out of decision block 509), then all of this job's changes to the state of the shared memory space are valid, and may be kept. Accordingly, it is the backup pages that are released (step 517) rather than the original pages. Again, however, it is no longer necessary to maintain the information about the backup pages, so this information is deleted from the history log (step 515).

In another class of embodiments, a privatization strategy is applied to the use of memory mapping to maintain speculative data. Referring now to the flow chart of FIG. 7, a privatization embodiment involves allocating a new page or pages (referred to herein as "private pages") to be used for holding the data generated by the speculatively executing job 207 (step 701). Data from the shared memory pages are then copied to the corresponding newly allocated private pages (step 703). Some systems reduce page table-related overhead by utilizing a translation lookaside buffer (TLB), which is an extra table that holds entries only for the most recently accessed pages and only for valid pages. In such systems, the TLB should be invalidated after the creation of the private pages.

In some embodiments, the entire shared memory space may be duplicated in the form of private pages. However, as will be seen, it may be preferable to duplicate only those pages that are actually going to be modified by the speculative job 207. This strategy avoids the overhead associated with needlessly copying data, and with unnecessarily tying up memory resources.

Following creation of the private pages, the job's MMU tables are revised to point to the private pages instead of to the corresponding shared pages (step 705). The speculative job 207 may then be run on one of the processors 103 in the system 101. Whenever the job 207 needs to update a shared data value, this operation is directed to a private, rather than a shared, page. A subsequent read to the same page should thereafter reference the private, rather than the shared page. However, a read to a page that has never been modified by the speculative job 207 should be directed to the page associated with the original shared memory space.

This strategy may be implemented in a number of alternative ways. If the MMU 119 supports software table lookups, it can map addresses by scanning the software table first, looking for mappings to private pages. If there are none, the MMU 119 then continues by scanning the original translation tables.

If the MMU 119 implements table look-ups in hardware, this approach is not possible. Instead, a private copy of the page tables must be created for the speculative job 207.

Figure 8A:
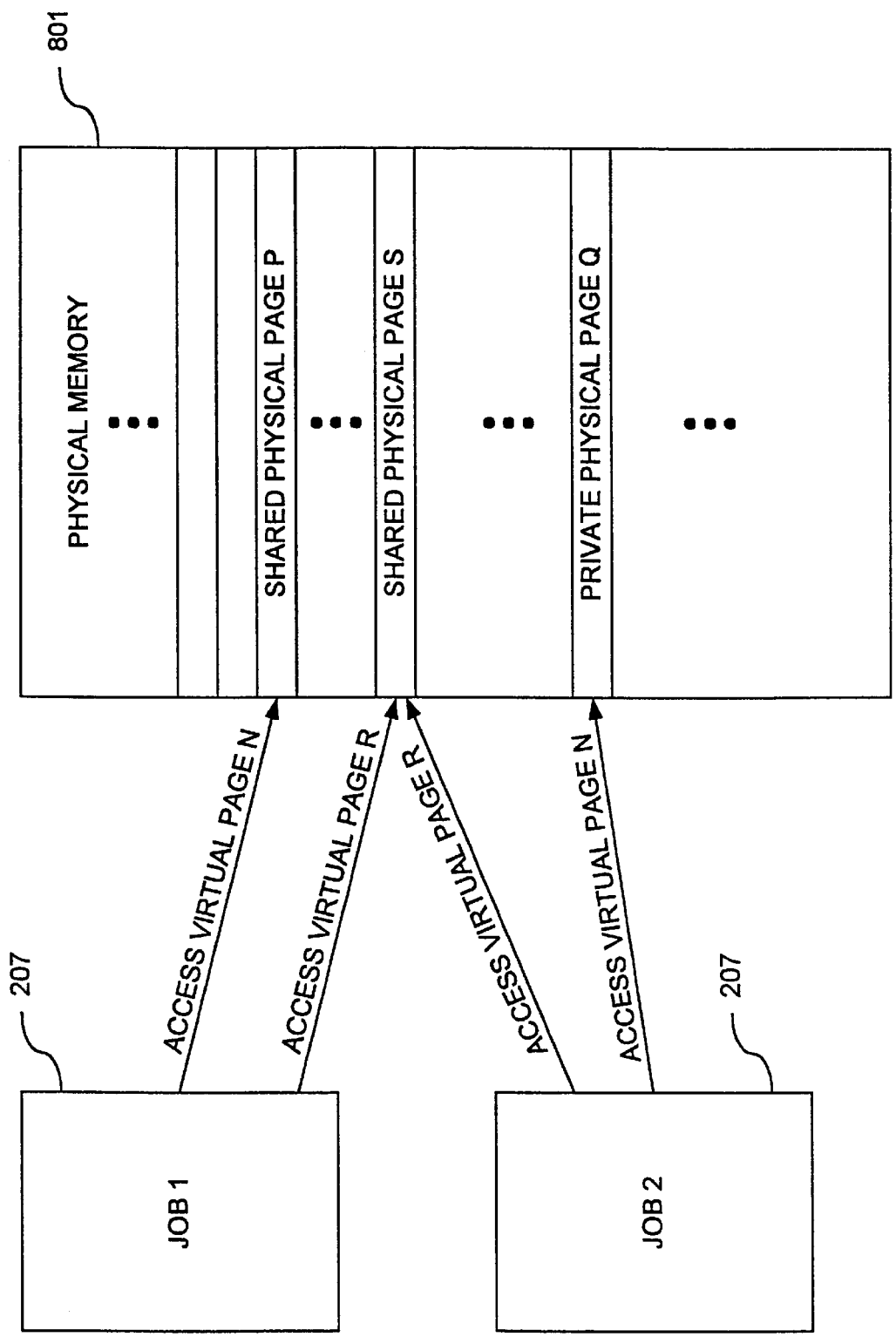
FIGS. 8a, 8b and 8c are block diagrams illustrating examples in which concurrently executing jobs apply a privatization strategy to the use of memory mapping for maintaining speculative data, in accordance with an aspect of the invention.

The job 207 then executes using the strategy outlined above. This situation is illustrated in the block diagram of FIG. 8a. In this example, two jobs 207 (numbered "1" and "2") share a virtual memory space, and execute concurrently. When the first job 209 accesses virtual page N, it is mapped to a shared physical page P in the physical memory 801. However, the second job 207 in this example is generating speculative data to virtual page N. Consequently, the second job's accesses to virtual page N are now mapped to a private physical page Q. The private physical page Q is not mapped to any of the virtual pages within the shared virtual address space. Consequently, the private physical page Q is not part of the shared physical address space. Also illustrated in FIG. 8a is an example in which each of the first and second jobs 207 have their accesses mapped to a same shared physical page S if neither is generating speculative data for a shared virtual page R.

Referring back now to FIG. 7, if the speculative execution of the job 207 does not succeed (due to collision with an earlier job 207) ("NO" path out of decision block 707), it is necessary to undo the shared memory state changes attributable to this job. This may be simply accomplished by releasing the speculative job's private pages (step 709). Because of the collision, the job 207 will be restarted. This is illustrated in FIG. 8b, which shows that the second job of the previous example (see FIG. 8a) at least initially has its accesses to virtual page N again mapped to shared physical page P. If there are no earlier jobs executing concurrently with the second job 207, there is no need to create private pages for it, since its execution is no longer speculative. However, if there are concurrently executing earlier jobs, then the second job is again executing speculative, so that private pages will again be allocated as described earlier.

Referring back again to FIG. 7, if the speculative execution of the job 207 was successful (i.e., there was no collision with an earlier job 207) ("YES" path out of decision block 707), then all of this job's changes to the state of the shared memory space are valid, and may be kept. Accordingly, the shared memory map tables are revised to include the private pages in place of the corresponding original pages (step 711). This will cause all subsequently created jobs to consider the formerly private pages as part of the shared memory space. Because the corresponding original pages no longer contain valid information, they are released (step 713).

Figure 8B:
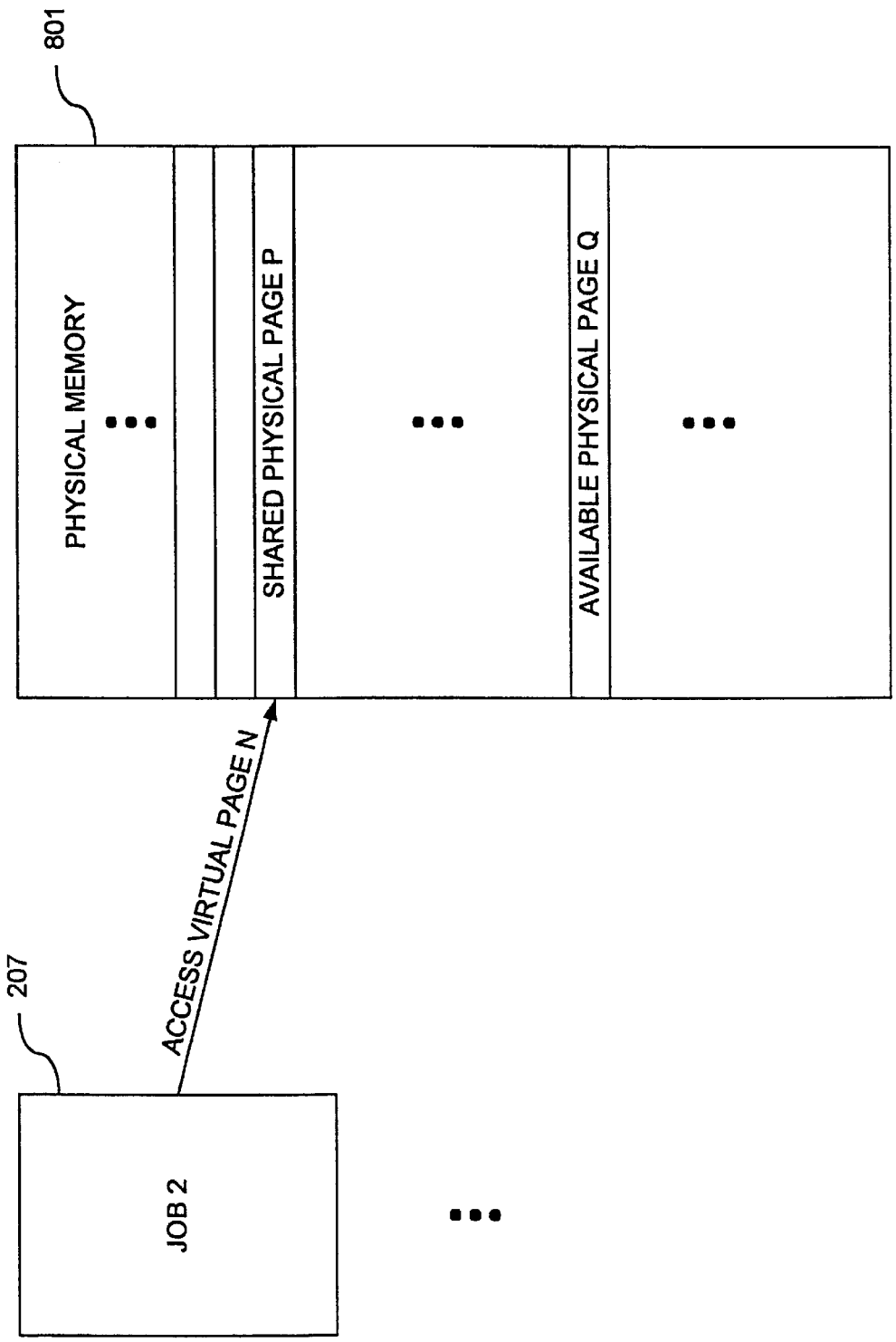
Figure 8C:
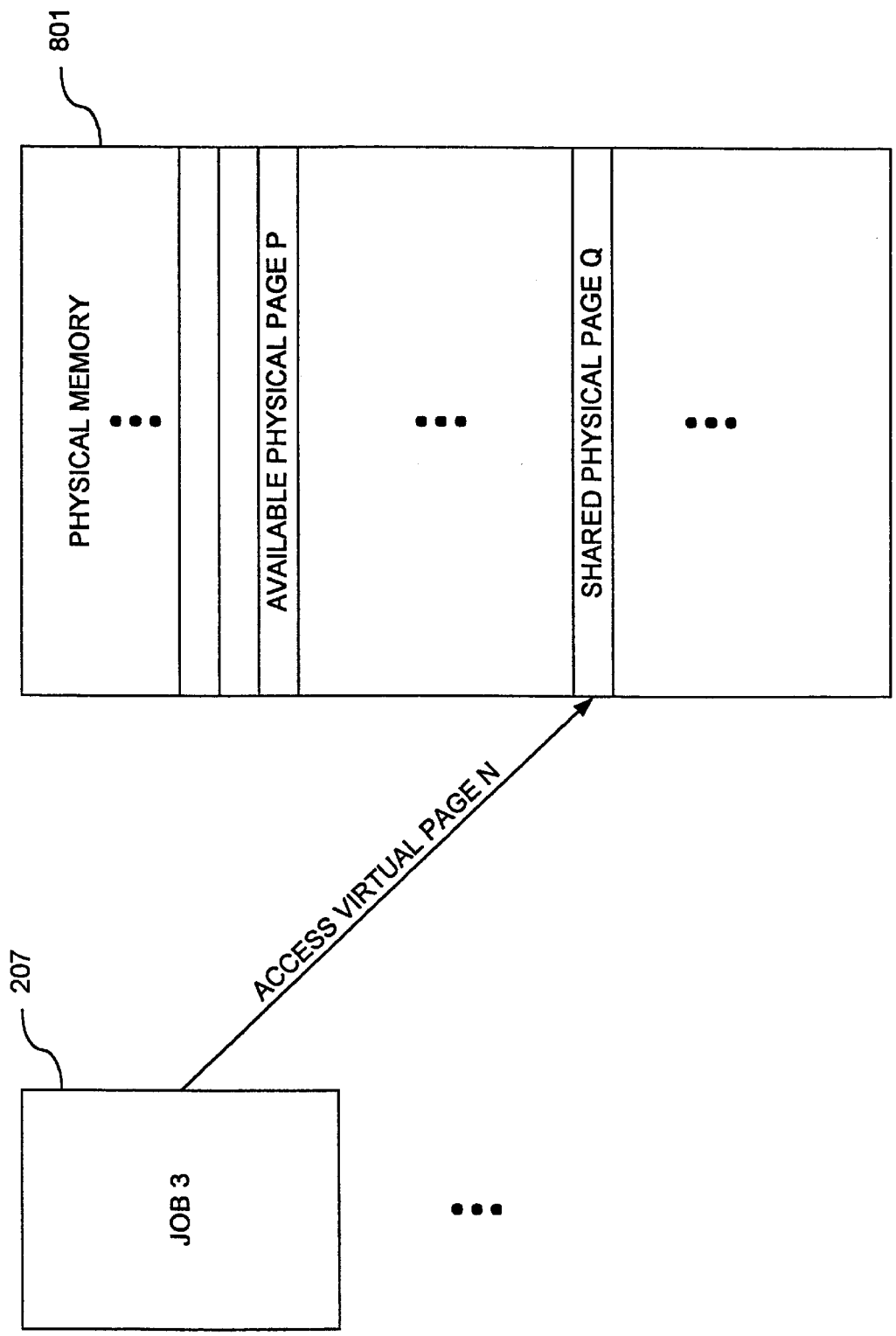

This situation is illustrated in the block diagram of FIG. 8c. Here, a subsequent job 207 (denoted job "3") has its accesses to virtual page N mapped to what is now the shared physical page Q. The physical page P that was formerly part of the shared physical address space is now an available physical page.

Figure 7:
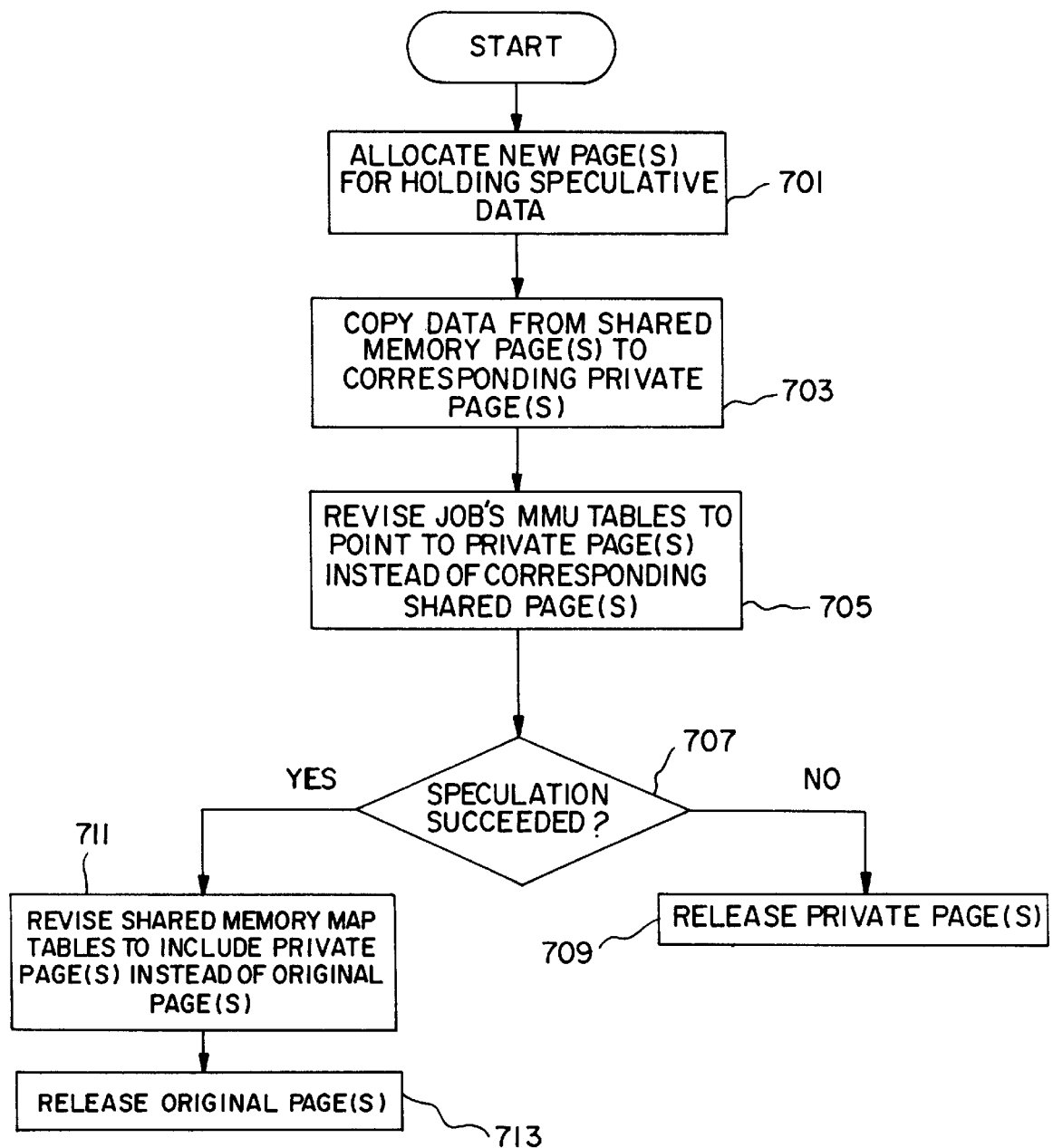
FIG. 7 is a flow chart of an exemplary technique for applying a privatization strategy to the use of memory mapping for maintaining speculative data, in accordance with an aspect of the invention.

It is apparent that the privatization strategy exemplified by the embodiment of FIG. 7 has a number of advantages, including the ease with which the speculative results can become the "official" state of the memory: Rather than copying data from a private memory area to a shared one, the same effect can be brought about simply by remapping the MMU tables to include the private pages as part of the shared memory space.

Each of the above-described techniques for maintaining speculative data separate and apart from a shared memory space involves allocating new pages, either for use as backup pages (non-privatization approach) or for use as private pages (privatization approach). Rather than allocating all pages at once when the speculative job is created, further improvements can be achieved by allocating a page on demand in response to a speculative job's first write directed to the corresponding shared page. This eliminates a lot of unnecessary overhead because, in most cases, a speculative job will only alter one or a few of the data pages associated with the shared memory space.

In order to adopt this strategy, it is necessary to be able to detect a first write to a page. In some embodiments, this is advantageously accomplished by again relying on features present in the MMUs found in most processors. In particular, for each speculative job 207, the "write protect" bit in that job's page table is initially set for each page associated with the shared memory space. When a speculative job 207 attempts to write to a protected page in the shared memory, a trap occurs. The purpose of the trap routine is to allocate a new page and to copy data from the corresponding shared page to the newly allocated page. The particular operations performed by the trap routine depend on whether the speculative data is being maintained in accordance with a non-privatization strategy, or whether a privatization strategy is being utilized. Each of these will now be discussed.

Figure 9:
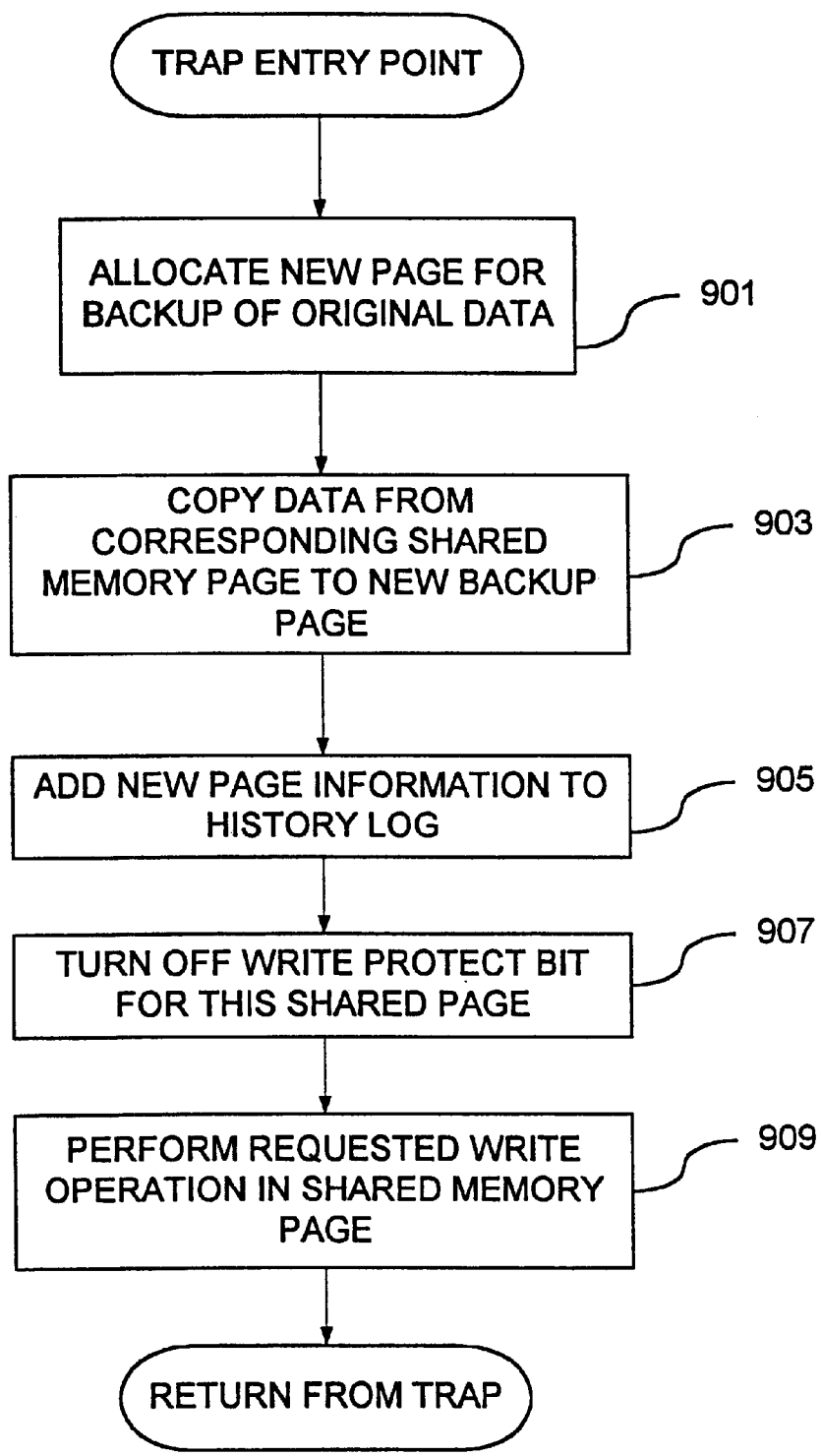
FIG. 9 is a flow chart of an exemplary trap routine for use in the case of a non-privatization strategy, in accordance with an aspect of the invention.

The steps performed by the trap routine in the case of a non-privatization strategy are illustrated in the flow chart of FIG. 9. First, a new page is allocated for use as a backup page (step 901). Next, data is copied from the corresponding shared memory page to the newly allocated backup page (step 903). Having created a copy of the original shared memory page, a pointer to the newly created backup page is then added to a system-maintained history log together with information identifying which original shared memory page it points to (step 905). As explained above with reference to FIG. 5, this information is used replace the original shared memory page with the backup copy in the event of a collision between the speculatively executing job 207 and an earlier on.

Only one backup copy per page is necessary for the non-privatization strategy to operate. Accordingly, the trap routine continues by turning off the write protect bit for this shared page (step 907). This prevents further traps from being taken (and additional backup copies of this same page from being made) if the speculative job 207 again attempts to write to this in the shared memory page.

In addition to the above, the trap routine also performs the write operation that caused the trap (step 909). This write is directed to the page that is presently part of the shared memory space. The trap routine may then exit, returning control back to the speculative job 209 that caused the trap exception.

Figure 10:
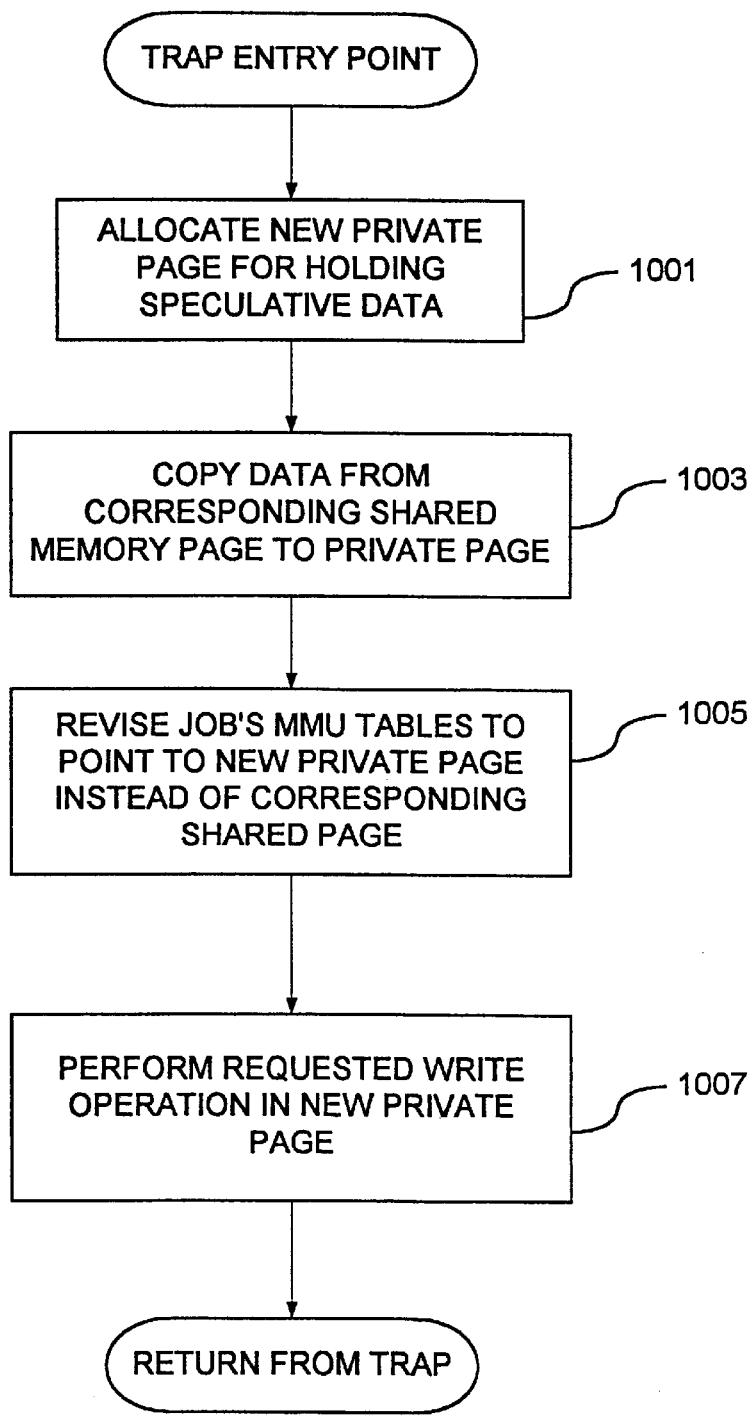
FIG. 10 is a flow chart of an exemplary trap routine for use in those embodiments of the invention that employ a privatization strategy to maintain the ability to undo changes to the memory state caused by speculative execution of a job.

Referring now to FIG. 10, this is a flow chart depicting an exemplary embodiment of steps that are performed by the trap routine for those embodiments that employ a privatization strategy to maintain the ability to undo changes to the memory state caused by speculative execution of a job 207. First, a new page is allocated for use by the speculative job 207 as a private page (step 1001). Next, data is copied from the corresponding shared memory page to the newly allocated private page (step 1003). Following creation of the private page, the job's MMU tables are revised to point to the private page instead of to the corresponding shared pages (step 1005). As explained above with reference to FIG. 5, this will cause the speculative job 207 to access its private page rather than the shared memory page whenever it performs a read or write. In making this revision to the MMU tables, steps should be taken to ensure that the write protect bit associated with the private page is not turned on, in order to prevent this trap from being repeated (and additional private pages being created for the same page of shared memory) if the speculative job 207 writes to the private page.

The private page will hold the final state generated by the speculative job 207. If speculation is successful, the private page will be substituted in place of the shared memory page, thereby becoming available to other jobs 207 as well. If speculation fails, however, the private page may be scrapped.

In addition to the above, the trap routine also performs the write operation that caused the trap (step 1007). This write is now directed to the private page, rather than the shared page, so that the original state of the shared memory space may be maintained. The trap routine may then exit, returning control back to the speculative job 209 that caused the trap exception.

A number of features have been described, including alternative embodiments of several of these features (e.g., "privatization" versus "non-privatization"; hardware-implemented versus software-implemented table lookup techniques; the use of PCBs vs the use of job signals to initiate jobs). Finding a best mix of these various alternatives depends on the characteristics of the particular system, including the length of the speculative jobs (longer jobs can tolerate a larger overhead for speculation), the number of pages that are updated by a speculative job (i.e., the overhead for speculation of one job) and the frequency of collisions. Because a best solution is application dependent, it is not possible to state one solution that will be best under all circumstances.

One approach to maintaining the speculative state of parallel executed jobs created from a PLEX-implemented application would be to:

1) Use a processor that uses software-implemented table walks.

2) Use a privatization strategy.

3) Use a private page table structure for maintaining private pages.

This table may be small and of fixed size (e.g., room for 8 entries). If the job needs more private pages than can be accommodated by the private table, then the job is stalled until it gets commit priority (i.e., until all earlier jobs have been retired).

4) In operation, the software-implemented table walk performs a table lookup by first searching for the requested virtual page in the private table. This search may, for example, be a linear search. If there is no hit in this private table, then a lookup is performed in the shared page table.

5) Page table entries corresponding to shared pages are initialized with the write-protect bit off. The software-implemented table walk routine sets the write protect bit when loading the entry into the TLB for speculative jobs, but not for a non-speculative job. This will cause a trap on the first write to the page by a speculative task.

6) The trap routine for handling this first write by a speculative job is responsible for creating a private copy of the page, and for creating the page table entry in the private page table.

7) When the job ends, assuming that there are no dependencies (collisions), the shared page table is updated to point to the job's private physical pages instead of the previously shared physical pages. The previously shared physical pages are then made available for allocation. Of course, if a collision occurs, the job does not complete, and the global state is never updated.

Dependency checking for this exemplary system can also be performed at a program block level, as described in U.S. patent application No. 09/438,320, filed on Mar. 12, 1999 in the name of N. Tikekar et al. and entitled "Coarse Grained Determination of Data Dependence Between Parallel Executed Jobs in an Information Processing System". Briefly stated, this strategy includes:

1) Allocating the data area belonging to each program block in such a way that it starts on page boundaries. This guarantees that no page will hold data belonging to two blocks.

2) Providing one vector comprising read bits associated with each program block, wherein one read bit is provided for each of the concurrently executed programs.

3) Setting the read bit associated with a particular program block whenever that block is entered for program execution. This operation is performed under the assumption that if a program block is entered, it will perform at least one read to a page contained within the program block. It should be noted that one job can enter more than one program block.

4) Clearing the read bit when the job is committed (i.e, retired).

5) Upon completion of a job, checking whether any read bit associated with a later job is set (i.e., after the completed job has both updated the shared state and performed its last write). If any such read bits are found to be set, the corresponding jobs are flushed and restarted.

A possible optimization of this dependency checking strategy is to, when a speculative job enters a block, check whether any earlier job has set its corresponding read bit. If so, the speculative job should stall, rather than continuing because it is guaranteed to be flushed and restarted anyway. The earlier job that has set the read bit will do the flush when it commits.

Figure 11:
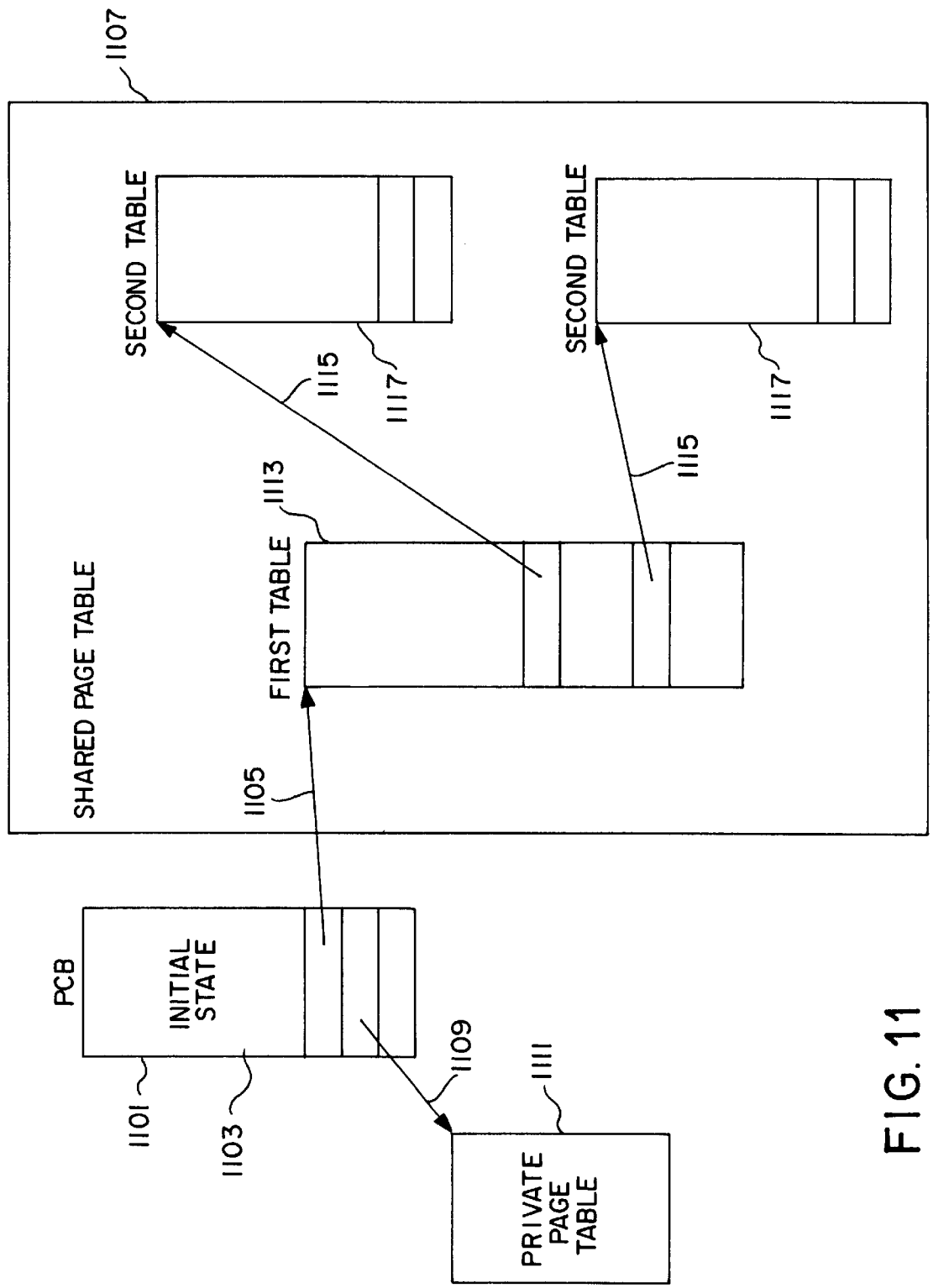
FIG. 11 is a block diagram of an exemplary process control block suitable for use in some embodiments of the invention.

This exemplary system may further use PCBs, rather than signals, to maintain a starting state for the job until it is known that the job will not need to be restarted (i.e., the job has been run and retired). A suitable PCB for this purpose is illustrated in FIG. 11. The exemplary PCB 1101 includes a portion for maintaining the initial state 1103, that is, processor register contents to be loaded when the job starts plus other administrative information. The PCB 1101 further includes a first pointer 1105 to a shared page table 1107 and a second pointer 1109 which points to a private page table 1111. The shared page table 1107 can, itself, comprise multiple levels of tables. For example, the first pointer 1105 to the shared page table may actually point to a first table 1113. Each entry contained within the first table 1113 is a pointer 1115 to a corresponding second table 1117, which contains the actual physical memory addresses and other information. In accordance with this architecture, mapping a virtual address to a physical address requires several lookup steps.

Existing software represents a large investment in many industries. Very often, this existing software is not designed to be broken up into jobs for coarse-grained concurrent execution on a multi-processor system. By means of the above-described techniques, such legacy software can continue to be used when a necessary performance gain requires a change of computer architecture. Existing sequentially programmed software does not have to be scrapped and rewritten. To a large extent, such software need not even be modified, but instead can be easily migrated to a multi-processor computer as is. Furthermore, dedicated hardware support does not have to be implemented to run this software, because memory management that is standard on most processors can be used to support the special needs of speculative execution.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a computer system that includes a paged physical memory, the method comprising:

defining a set of shared virtual pages that stores data that are shared by a first job and a second job;

defining a set of shared physical pages in the paged physical memory, wherein there is a one-to-one correspondence between the set of shared virtual pages and the set of shared physical pages;

using a first memory map to cause the first job to access a first shared physical page in the paged physical memory whenever the first job accesses any location in a first virtual page in the set of shared virtual pages, wherein the first shared physical page is in the set of shared physical pages;

using a second memory map to cause the second job to access the first shared physical page in the paged physical memory whenever the second job accesses any location in the first virtual page; and using the second memory map to cause the second job to access a private physical page whenever the second job accesses any location in a second virtual page in the set of shared virtual pages, wherein the private physical page is not in the set of shared physical pages.

2. The method of claim 1, further comprising:

creating the private physical page in response to a sequentially first write operation directed to the second virtual page by the second job.

3. The method of claim 2, wherein the step of creating the private physical page is performed in response to a first write protect interrupt associated with the sequentially first write operation directed to the second virtual page by the second job.

4. The method of claim 3, further comprising the preliminary steps of:

initializing a translation lookaside buffer with one or more entries from the first memory map; and initially enabling write protection in connection with one or more pages identified by the one or more entries from the first memory map.

5. The method of claim 4, further comprising the step of:

disabling write protection associated with the second virtual page after the first write protect interrupt.

6. The method of claim 1, further comprising:

using the first memory map to cause the first job to access a second shared physical page in the paged physical memory whenever the first job accesses any location in the second virtual page, wherein the second shared physical page is in the set of shared physical pages.

7. The method of claim 1, further comprising:

detecting a collision between the first job and the second job; and in response to the collision, releasing the private physical page.

8. The method of claim 1, further comprising:

completing both the first job and the second job without an occurrence of a collision between the first and second jobs; and redefining the set of shared physical pages to include the private physical page in place of the second shared physical page.

9. The method of claim 1, further comprising:

running the first job on a first processor in the computer system;

running the second job on a second processor in the computer system, wherein:

at least some portion of the first job is running concurrently with at least some portion of the second job; and the first and second processors each access the paged physical memory.

10. The method of claim 9, further comprising:

designating the first job as an earlier job in comparison to the second job.

11. The method of claim 10, wherein the first job was received by the computer system prior to receipt of the second job.

12. The method of claim 10, wherein:

the first and second jobs are generated from a same program that is designed for sequential execution on a single processor; and whenever the same program is sequentially executed on the single processor, the first job is completed prior to starting execution of the second job.

13. The method of claim 1, wherein:

the second memory map comprises a shared page table and a private page table;

the shared page table stores mappings between shared virtual pages and shared physical pages; and the private page table stores mappings only between shared virtual pages and private physical pages.

14. The method of claim 13, wherein the step of using the second memory map to cause the second job to access the first shared physical page in the paged physical memory whenever the second job accesses any location in the first virtual page comprises:

first determining whether a mapping associated with the first virtual page is stored in the private page table; and then locating a mapping associated with the first virtual page in the shared page table if the private page table does not have stored therein any mapping associated with the first virtual page.

15. A method of operating a computer system that includes a paged physical memory, the method comprising:

defining a set of shared virtual pages that stores data that are shared by a first job and a second job;

defining a set of shared physical pages in the paged physical memory, wherein there is a one-to-one correspondence between the set of shared virtual pages and the set of shared physical pages;

using a first memory map to cause the first job to access a first shared physical page in the paged physical memory whenever the first job accesses any location in a first virtual page in the set of shared virtual pages, wherein the first shared physical page is in the set of shared physical pages;

using a second memory map to cause the second job to access the first shared physical page in the paged physical memory whenever the second job accesses any location in the first virtual page; and creating a backup physical page in response to a sequentially first write operation directed to the first virtual page by the second job, wherein the backup physical page includes a copy of all data contained in the first shared physical page, and wherein the backup physical page is not in the set of shared physical pages.

16. The method of claim 15, further comprising:

detecting a collision between the first job and the second job; and in response to the collision, redefining the set of shared physical pages to include the backup physical page in place of the first shared physical page.

17. The method of claim 15, further comprising:

completing both the first job and the second job without an occurrence of a collision between the first and second jobs; and releasing the backup physical page.

18. The method of claim 15, further comprising:

running the first job on a first processor in the computer system;

running the second job on a second processor in the computer system, wherein:

at least some portion of the first job is running concurrently with at least some portion of the second job; and the first and second processors each access the paged physical memory.

19. The method of claim 18, further comprising:

designating the first job as an earlier job in comparison to the second job.

20. The method of claim 19, wherein the first job was received by the computer system prior to receipt of the second job.

21. The method of claim 19, wherein:

the first and second jobs are generated from a same program that is designed for sequential execution on a single processor; and whenever the same program is sequentially executed on the single processor, the first job is completed prior to starting execution of the second job.

22. An apparatus for operating a computer system that includes a paged physical memory, the apparatus comprising:

logic configured to define a set of shared virtual pages that stores data that are shared by a first job and a second job;

logic configured to define a set of shared physical pages in the paged physical memory, wherein there is a one-to-one correspondence between the set of shared virtual pages and the set of shared physical pages;

a first memory map that causes the first job to access a first shared physical page in the paged physical memory whenever the first job accesses any location in a first virtual page in the set of shared virtual pages, wherein the first shared physical page is in the set of shared physical pages; and a second memory map that causes the second job to access the first shared physical page in the paged physical memory whenever the second job accesses any location in the first virtual page, wherein the second memory map further causes the second job to access a private physical page whenever the second job accesses any location in a second virtual page in the set of shared virtual pages, wherein the private physical page is not in the set of shared physical pages.

23. The apparatus of claim 22, further comprising:
logic configured to create the private physical page in response to a sequentially first write operation directed to the second virtual page by the second job.

24. The apparatus of claim 23, wherein the logic configured to create the private physical page operates in response to a first write protect interrupt associated with the sequentially first write operation directed to the second virtual page by the second job.

25. The apparatus of claim 24, further comprising:
a translation lookaside buffer associated with the second job;
logic configured to initialize the translation lookaside buffer with one or more entries from the first memory map; and
logic configured to initially enable write protection in connection with one or more pages identified by the one or more entries from the first memory map.

26. The apparatus of claim 25, further comprising:
logic configured to disable write protection associated with the second virtual page in the translation lookaside buffer after the first write protect interrupt.

27. The apparatus of claim 22, wherein:
the first memory map further causes the first job to access a second shared physical page in the paged physical memory whenever the first job accesses any location in the second virtual page, wherein the second shared physical page is in the set of shared physical pages.

28. The apparatus of claim 22, further comprising:
logic configured to detect a collision between the first job and the second job; and
logic configured to release the private physical page in response to the collision.

29. The apparatus of claim 22, further comprising:
logic configured to redefine the set of shared physical pages to include the private physical page in place of the second shared physical page in response to both the first job and the second job completing without an occurrence of a collision between the first and second jobs.

30. The apparatus of claim 22, further comprising:
logic configured to run the first job on a first processor in the computer system, and to run the second job on a second processor in the computer system, wherein:
at least some portion of the first job is run concurrently with at least some portion of the second job; and
the first and second processors each access the paged physical memory.

31. The apparatus of claim 30, further comprising:
logic configured to designate the first job as an earlier job in comparison to the second job.

32. The apparatus of claim 31, wherein the logic configured to designate the first job as an earlier job in comparison to the second job does so in response to the first job being received by the computer system prior to receipt of the second job.

33. The apparatus of claim 31, further comprising:
logic configured to generate the first and second jobs from a same program that is designed for sequential execution on a single processor,
wherein the first job is completed prior to starting execution of the second job whenever the same program is sequentially executed on the single processor.

34. The apparatus of claim 22, wherein:
the second memory map comprises a shared page table and a private page table;
the shared page table stores mappings between shared virtual pages and shared physical pages; and
the private page table stores mappings only between shared virtual pages and private physical pages.

35. The apparatus of claim 34, further comprising:
logic configured to first determine whether a mapping associated with the first virtual page is stored in the private page table; and
logic configured to locate a mapping associated with the first virtual page in the shared page table if the private page table does not have stored therein any mapping associated with the first virtual page.

36. An apparatus for operating a computer system that includes a paged physical memory, the apparatus comprising:
logic configured to define a set of shared virtual pages that stores data that are shared by a first job and a second job;
logic configured to define a set of shared physical pages in the paged physical memory, wherein there is a one-to-one correspondence between the set of shared virtual pages and the set of shared physical pages;
a first memory map that causes the first job to access a first shared physical page in the paged physical memory whenever the first job accesses any location in a first virtual page in the set of shared virtual pages, wherein the first shared physical page is in the set of shared physical pages;
a second memory map that causes the second job to access the first shared physical page in the paged physical memory whenever the second job accesses any location in the first virtual page; and
logic configured to create a backup physical page in response to a sequentially first write operation directed to the first virtual page by the second job, wherein the backup physical page includes a copy of all data contained in the first shared physical page, and wherein the backup physical page is not in the set of shared physical pages.

37. The apparatus of claim 36, further comprising:
logic configured to detect a collision between the first job and the second job; and
logic configured to redefine the set of shared physical pages to include the backup physical page in place of the first shared physical page in response to the collision.

38. The apparatus of claim 36, further comprising:
logic configured to release the backup physical page in response to both the first job and the second job completing without an occurrence of a collision between the first and second jobs.

39. The apparatus of claim 36, further comprising:
logic configured to run the first job on a first processor in the computer system, and to run the second job on a second processor in the computer system, wherein:

at least some portion of the first job is running concurrently with at least some portion of the second job; and the first and second processors each access the paged physical memory.

40. The apparatus of claim 39, further comprising:

logic configured to designate the first job as an earlier job in comparison to the second job.

41. The apparatus of claim 40, wherein the logic configured to designate the first job as an earlier job in comparison to the second job does so in response to the first job being received by the computer system prior to receipt of the second job.

42. The apparatus of claim 40, further comprising:

logic configured to generate the first and second jobs from a same program that is designed for sequential execution on a single processor, wherein the first job is completed prior to starting execution of the second job whenever the same program is sequentially executed on the single processor.

* * * * *